US006168716B1

(12) United States Patent
Conrad et al.

(10) Patent No.: US 6,168,716 B1
(45) Date of Patent: Jan. 2, 2001

(54) CYCLONE SEPARATOR HAVING A VARIABLE TRANSVERSE PROFILE

(75) Inventors: Wayne Ernest Conrad; Helmut Gerhard Conrad; Ted Szylowiec, all of Hampton (CA)

(73) Assignee: G.B.D. Corp.(KY)

( * ) Notice: Under 35 U.S.C. 154(b), the term of this patent shall be extended for 0 days.

(21) Appl. No.: 09/136,367

(22) Filed: Aug. 19, 1998

(51) Int. Cl.$^{7}$ ............................ B04C 5/185; B01D 21/26

(52) U.S. Cl. .................................... 210/512.2; 210/512.1; 210/788; 55/345; 55/429; 55/459.1; 55/DIG. 3

(58) Field of Search .......................... 55/345, 429, 459.1, 55/459.2, 459.3, 459.4, 459.5, DIG. 3; 210/512.1, 512.2, 787, 788

(56) References Cited

U.S. PATENT DOCUMENTS

| | | |
|---|---|---|
| Re. 32,257 | 10/1986 | Dyson . |
| D. 305,269 | 12/1989 | Dyson . |
| D. 343,707 | 1/1994 | Dyson . |
| D. 382,679 | 8/1997 | Dyson . |
| 450,372 | 4/1891 | Morse . |
| 883,413 | 3/1908 | Mahony . |
| 1,023,082 | 4/1912 | Kluge . |
| 1,127,896 | 2/1915 | Keller . |
| 1,369,939 | 3/1921 | Shaffer . |
| 1,752,231 | 3/1930 | Clarkson . |
| 1,798,510 | 3/1931 | Winslow et al. . |
| 1,826,798 | 10/1931 | Lee . |
| 1,897,144 | 2/1933 | Prouty . |
| 2,014,287 | 10/1935 | Newman . |
| 2,143,421 | 1/1939 | Loehr et al. . |
| 2,171,248 | 9/1939 | Van Berkel . |
| 2,392,872 | 1/1946 | Wolfe . .................................. Petri . |

(List continued on next page.)

FOREIGN PATENT DOCUMENTS

| | | |
|---|---|---|
| 54488 | 5/1985 | (CA) . |
| 2104136 | 6/1994 | (CA) . |
| 2156069 | 6/1996 | (CA) . |
| 34 35 214 | 4/1986 | (DE) . |
| 52195 | 9/1936 | (DK) . |
| 69708 | 1/1949 | (DK) . |
| 1 037980 | 9/1953 | (FR) . |
| 762070 | 12/1950 | (GB) . |
| 2 108 013 | 5/1983 | (GB) . |
| 2 113 575 | 8/1983 | (GB) . |
| 2 309 182 | 7/1997 | (GB) . |
| 148023 | 10/1961 | (SU) . |
| 1042812 | 9/1983 | (SU) . |
| 82 00451 | 2/1982 | (WO) . |
| WO 96/19293 | 6/1996 | (WO) . |
| WO 96/19294 | 6/1996 | (WO) . |
| WO 96/19936 | 7/1996 | (WO) . |
| WO 96/19937 | 7/1996 | (WO) . |
| WO 96/21389 | 7/1996 | (WO) . |
| WO 96/22726 | 8/1996 | (WO) . |
| 96 27446 | 9/1996 | (WO) . |
| WO 98/02080 | 1/1998 | (WO) . |
| WO 98/10691 | 3/1998 | (WO) . |
| WO 98/23381 | 6/1998 | (WO) . |
| WO 98/27857 | 7/1998 | (WO) . |
| WO 98/33424 | 8/1998 | (WO) . |

* cited by examiner

*Primary Examiner*—David A. Reifsnyder
(74) *Attorney, Agent, or Firm*—Reed Smith Hazel & Thomas LLP

(57) ABSTRACT

A cyclone separator having an improved efficiency to remove a broader spectrum of contained particles is disclosed. The transverse section of the inner wall of the cyclone separator is configured to impart changes in the rate of acceleration of a fluid as it rotates within the cyclone cavity.

58 Claims, 38 Drawing Sheets

U.S. PATENT DOCUMENTS

| | | | | |
|---|---|---|---|---|
| 2,397,872 | | 4/1946 | Kovacs . | |
| 2,397,980 | | 4/1946 | | |
| 2,402,845 | | 6/1946 | Rodman . | |
| 2,405,625 | | 8/1946 | Whiton et al. . | |
| 2,608,268 | | 8/1952 | Gerber . | |
| 2,681,124 | | 6/1954 | Van der Kolk . | |
| 2,822,060 | | 2/1958 | Udovich . | |
| 2,993,223 | | 7/1961 | Krammes . | |
| 3,200,568 | | 8/1965 | McNeil . | |
| 3,235,090 | | 2/1966 | Bose et al. . | |
| 3,283,480 | | 11/1966 | Szego . | |
| 3,320,727 | | 5/1967 | Farley et al. . | |
| 3,425,192 | | 2/1969 | Davis . | |
| 3,501,014 | | 3/1970 | Fitch, Jr. et al. . | |
| 3,535,854 | | 10/1970 | Taylor . | |
| 3,853,518 | | 12/1974 | Tu et al. . | |
| 3,877,902 | | 4/1975 | Eriksson et al. . | |
| 3,925,045 | | 12/1975 | Cheng . | |
| 3,953,184 | * | 4/1976 | Stockford et al. | 55/459.3 |
| 3,955,236 | | 5/1976 | Mekelburg . | |
| 4,005,998 | | 2/1977 | Gorman . | |
| 4,141,698 | | 2/1979 | Kihlstedt et al. . | |
| 4,162,149 | | 7/1979 | Mekelburg . | |
| 4,198,290 | | 4/1980 | Summers . | |
| 4,251,368 | | 2/1981 | Colman et al. . | |
| 4,268,288 | | 5/1981 | Coombs . | |
| 4,326,862 | | 4/1982 | Suzuki . | |
| 4,345,572 | | 8/1982 | Suzuki et al. . | |
| 4,352,681 | | 10/1982 | Dietz . | |
| 4,373,228 | | 2/1983 | Dyson . | |
| 4,377,882 | | 3/1983 | Dyson . | |
| 4,390,426 | | 6/1983 | Vicard . | |
| 4,398,928 | | 8/1983 | Kunsagi . | |
| 4,443,234 | | 4/1984 | Carlsson . | |
| 4,571,772 | | 2/1986 | Dyson . | |
| 4,573,236 | | 3/1986 | Dyson . | |
| 4,588,423 | | 5/1986 | Gillingham et al. . | |
| 4,593,429 | | 6/1986 | Dyson . | |
| 4,643,748 | | 2/1987 | Dyson . | |
| 4,756,729 | | 7/1988 | Brunnmair et al. . | |
| 4,826,515 | | 5/1989 | Dyson . | |
| 4,848,991 | * | 7/1989 | Bielefeldt | 55/459.1 |
| 4,853,008 | | 8/1989 | Dyson . | |
| 4,853,011 | | 8/1989 | Dyson . | |
| 5,062,870 | | 11/1991 | Dyson . | |
| 5,078,761 | | 1/1992 | Dyson . | |
| 5,090,976 | | 2/1992 | Dyson . | |
| 5,101,532 | | 4/1992 | Dyson et al. . | |
| 5,145,499 | | 9/1992 | Dyson . | |
| 5,160,356 | | 11/1992 | Dyson . | |
| 5,267,371 | | 12/1993 | Soler et al. . | |
| 5,350,432 | | 9/1994 | Lee . | |
| 5,558,697 | | 9/1996 | Dyson et al. . | |
| 5,591,253 | | 1/1997 | Altman et al. . | |
| 5,755,007 | | 5/1998 | Dyson . | |

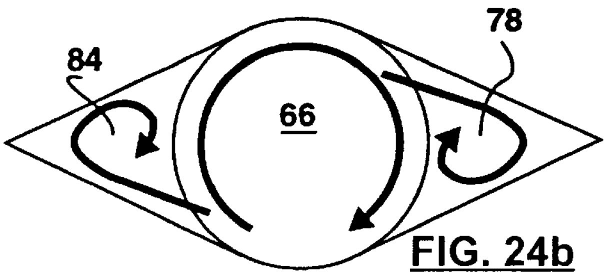
FIG. 24b
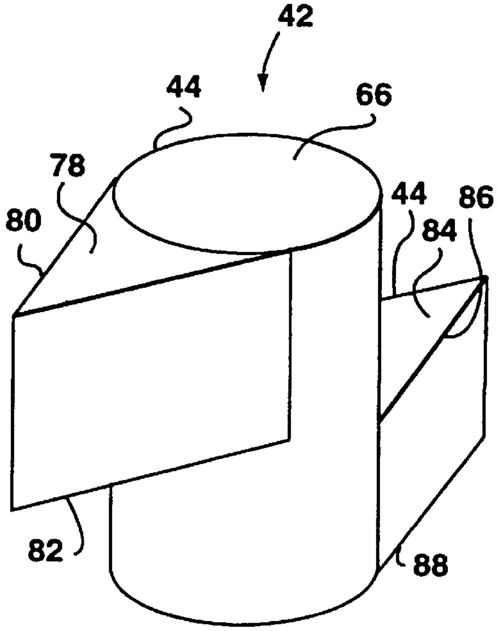
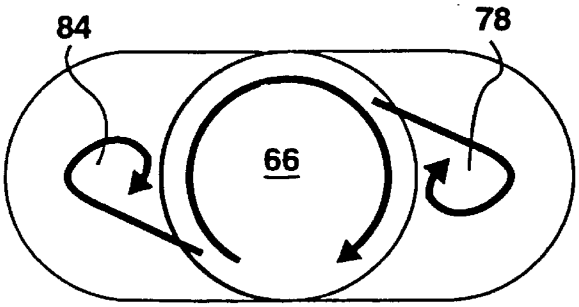
FIG. 24c
FIG. 24a
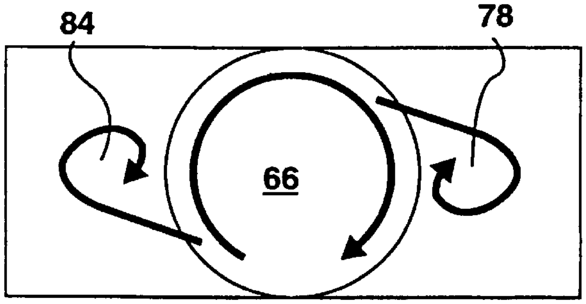
FIG. 24d
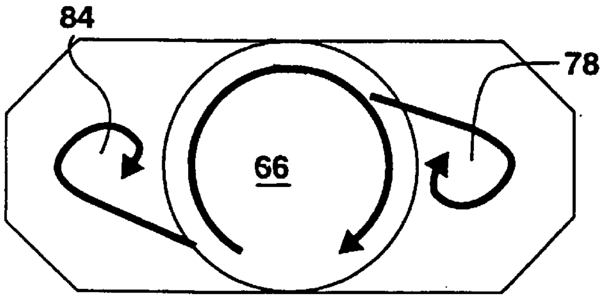
FIG. 24e

CYCLONE SEPARATOR HAVING A VARIABLE TRANSVERSE PROFILE

FIELD OF THE INVENTION

This invention relates to an improved apparatus for separating a component from a fluid stream. In one embodiment, the fluid may be a gas having solid and/or liquid particles and/or a second gas suspended, mixed, or entrained therein and the separator is used to separate the particles and/or the second gas from the gas stream. In an alternate embodiment, the fluid may be a liquid which has solid particles, and/or a second liquid and/or a gas suspended, mixed, or entrained therein and the separator is used to remove the solid particles and/or the second liquid and/or the gas from the liquid stream. The improved separator may be used in various applications including vacuum cleaners, liquid/liquid separation, smoke stack scrubbers, pollution control devices, mist separators, an air inlet for a turbo machinery and as pre-treatment equipment in advance of a pump for a fluid (either a liquid, a gas or a mixture thereof) and other applications where it may be desirable to remove particulate or other material separable from a fluid in a cyclone separator.

BACKGROUND OF THE INVENTION

Cyclone separators are devices that utilize centrifugal forces and low pressure caused by spinning motion to separate materials of differing density, size and shape. FIG. 1 illustrates the operating principles in a typical cyclone separator (designated by reference numeral 10 in FIG. 1) which is in current use. The following is a description of the operating principles of cyclone separator 10 in terms of its application to removing entrained particles from a gas stream, such as may be used in a vacuum cleaner.

Cyclone separator 10 has an inlet pipe 12 and a main body comprising upper cylindrical portion 14 and lower frusto-conical portion 16. The particle laden gas stream is injected through inlet pipe 12 which is positioned tangentially to upper cylindrical portion 14. The shape of inlet port 12, upper cylindrical portion 14 and frusto-conical portion 16 induces the gas stream to spin creating a vortex. Larger or more dense particles are forced outwards to the walls of cyclone separator 10 where the drag of the spinning air as well as the force of gravity causes them to fall down the walls into an outlet or collector 18. The lighter or less dense particles, as well as the gas medium itself, reverses course at approximately collector G and pass outwardly through the low pressure centre of separator 10 and exits separator 10 via gas outlet 20 which is positioned in the upper portion of upper cylindrical portion 14.

The separation process in cyclones generally requires a steady flow, free of fluctuations or short term variations in the flow rate. The inlet and outlets of cyclone separators are typically operated open to the atmosphere so that there is no pressure difference between the two. If one of the outlets must be operated at a back pressure, both outlets would typically be kept at the same pressure.

When a cyclone separator is designed, the principal factors which are typically considered are the efficiency of the cyclone separator in removing particles of different diameters and the pressure drop associated with the cyclone operation. The principle geometric factors which are used in designing a cyclone separator are the inlet height (A); the inlet width (B); the gas outlet diameter (C); the outlet duct length (D); the cone height (Lc); the dirt outlet diameter (G); and, the cylinder height (L)

The value $d_{50}$ represents the smallest diameter particle of which 50 percent is removed by the cyclone. Current cyclones have a limitation that the geometry controls the particle removal efficiency for a given particle diameter. The dimensions which may be varied to alter the $d_{50}$ value are features (A)–(D), (G), (L) and (Lc) which are listed above.

Typically, there are four ways to increase the small particle removal efficiency of a cyclone. These are (1) reducing the cyclone diameter; (2) reducing the outlet diameter; (3) reducing the cone angle; and (4) increasing the body length. If it is acceptable to increase the pressure drop, then an increase in the pressure drop will (1) increase the particle capture efficiency; (2) increase the capacity and (3) decrease the underflow to throughput ratio.

In terms of importance, it appears that the most important parameter is the cyclone diameter. A smaller cyclone diameter implies a smaller $d_{50}$ value by virtue of the higher cyclone speeds and the higher centrifugal forces which may be achieved. For two cyclones of the same diameter, the next most important design parameter appears to be L/d, namely the length of the cylindrical section 14 divided by the diameter of the cyclone and Lc/d, the length of the conical section 16 divided by the width of the cone. Varying L/d and Lc/d will affect the $d_{50}$ performance of the separation process in the cyclone.

Typically, the particles which are suspended or entrained in a gas stream are not homogeneous in their particle size distribution. The fact that particle sizes take on a spectrum of values often necessitates that a plurality of cyclonic separators be used in series. For example, the first cyclonic separator in a series may have a large $d_{50}$ specification followed by one with a smaller $d_{50}$ specification. The prior art does not disclose any method by which a single cyclone may be tuned over the range of possible $d_{50}$ values.

An example of the current limitation in cyclonic separator design is that which has been recently applied to vacuum cleaner designs. In U.S. Pat. Nos. 4,373,228; 4,571,772; 4,573,236; 4,593,429; 4,643,748; 4,826,515; 4,853,008; 4,853,011; 5,062,870; 5,078,761; 5,090,976; 5,145,499; 5,160,356; 5,255,411; 5,358,290; 5,558,697; and RE 32,257, a novel approach to vacuum cleaner design is taught in which sequential cyclones are utilized as the filtration medium for a vacuum cleaner. Pursuant to the teaching of these patents, the first sequential cyclone has a cylindrical dirt rotational wall and is designed to be of a lower efficiency to remove only the larger particles which are entrained in an air stream. The smaller particles remain entrained in the gas stream and are transported to the second sequential cyclone which is frusto-conical in shape. The second sequential cyclone is designed to remove the smaller particles which are entrained in the air stream. If larger particles are carried over into the second cyclone separator, then they will typically not be removed by the second cyclone separator but exit the frusto-conical cyclone with the gas stream.

Accordingly, the use of a plurality of cyclone separators in a series is documented in the art. It is also known how to design a series of separators to remove entrained or suspended material from a fluid stream. Such an approach has two problems. First, it requires a plurality of separators. This requires additional space to house all of the separators and, secondly additional material costs in producing each of the separators. The second problem is that if any of the larger material is not removed prior to the fluid stream entering the next cyclone separator, the subsequent cyclone separator typically will allow such material to pass therethrough as it is only designed to remove smaller particles from the fluid stream.

An alternate approach is disclosed in U.S. Pat. No. 2,171,248 wherein a plurality of dust trapping ribs which extend transversely of the cyclone stream are provided on the inner surface of the cyclone wall. According to the disclosure of this patent, the dust is forced centrifugally towards the housing wall and strikes against the ribs so that the dust falls downwards into the dust collector. One disadvantage of this approach is that if the ribs extend into the path of the air as it rotates, they will destructively interfere with the cyclonic flow of the air in the housing.

SUMMARY OF THE PRESENT INVENTION

In accordance with one embodiment of the instant invention, there is provided a cyclone separator for separating a material from a fluid comprising a longitudinally extending body having a wall extending around an internal cavity, the wall having an inner surface, the internal cavity having, in transverse section, an inner portion in which the fluid rotates when the separator is in use and at least one outer portion positioned external to the inner portion and contiguous therewith, the outer portion of the cavity extending outwardly from the inner portion of the cavity and defining a zone in which at least a portion of the fluid expands outwardly as it rotates in the plane defined by the transverse section, the portion of the fluid in the outer portion of the cavity having different fluid flow characteristics compared to those of the fluid rotating in the inner portion of the cavity which promote the separation of the material from the fluid.

In accordance with another embodiment of the instant invention, there is provided a cyclone separator for separating a material from a fluid comprising a longitudinally extending body having a wall which, in transverse section, extends in a continuous closed path, the wall having a non-baffled inner surface which defines an internal cavity, the internal cavity having an inner portion in which the fluid rotates when the separator is in use, and at least one outer portion positioned external to the inner portion and contiguous therewith defining a zone in which the wall is configured to impart to at least a portion of the fluid as it rotates in the plane defined by the transverse section different fluid flow characteristics compared to those of the fluid rotating in the inner portion of the cavity which promote the separation of the material from the fluid.

The inner surface of the wall may be configured to impart changes in the rate of acceleration to the portion of the fluid as it rotates in the plane defined by the transverse section. In another embodiment, the wall is configured to continuously impart changes in the rate of acceleration to the fluid as it rotates in the plane defined by the transverse section. In another embodiment, the wall interacts with the portion of the fluid to impart to the portion of the fluid a different speed, a different direction of travel or a different velocity compared to that of the fluid rotating in the inner portion of the cavity.

The inner surface of the wall may be configured to interact with the portion of the fluid to create a dead air space in the outer portion of the cavity. The dead air space may extend longitudinally in the same direction as the separator. In another embodiment, the rotation of the fluid in the inner portion defines a first cyclone and the inner surface of the wall may be configured to interact with the portion of the fluid to cause the portion to rotate to define at least one second cyclone exterior to the first cyclone. In a still further embodiment, the rotation of the fluid in the inner portion defines a first cyclone and the inner surface of the wall around the outer portion is configured to interact with the portion of the fluid to create a dead air space in the outer portion of the cavity and to cause the portion to rotate to define at least one second cyclone exterior to the first cyclone. In another embodiment, the cavity has a plurality of outer portions and one or more, and preferably all, of the outer portions are so configured.

The outer portion may have a receiving portion provided therein or, alternately, the outer portion may have a receiving portion in flow communication therewith. In one embodiment, the separator is vertically disposed and, in this configuration, the receiving portion is positioned towards the lower end of the separator and comprises a collecting chamber in which the separated material is collected. Alternately, the separator may have an upstream end and a downstream end and the receiving portion may be positioned towards the downstream end of the separator and may be in flow communication with a chamber downstream thereof. In another embodiment, the cavity has a plurality of outer portions and one or more, and preferably all, of the outer portions are so configured. Alternately, each of the outer portions may have an upstream end and a downstream end, the upstream end of at least one of the outer portions longitudinally positioned at a portion of the inner surface different to the position of the upstream end of another outer portion. Alternately, the upstream end of at least one of the outer portions may be longitudinally positioned at a portion of the inner surface adjacent the downstream end of another outer portion.

In one embodiment, the fluid which is introduced into the cyclone comprises a gas which has a material selected from the group consisting of solid particles, a liquid, a second gas and a mixture thereof contained therein and a portion of the material is removed from the gas as the gas passes through the separator.

In another embodiment, the fluid which is introduced into the cyclone comprises a liquid which has a material selected from the group consisting of solid particles, a second liquid, a gas and a mixture thereof contained therein and a portion of the material is removed from the liquid as the liquid passes through the separator.

In a further alternate embodiment, the fluid which is introduced into the cyclone comprises at least two fluids having different densities and the inner wall includes at least a portion which is configured to decrease the rate of acceleration of the fluid as it passes through that portion of the separator.

The separator may comprise a dirt filter for a vacuum cleaner, an air inlet for turbo machinery, treatment apparatus positioned upstream of a fluid pump, treatment apparatus positioned upstream of a pump for a gas or treatment apparatus positioned upstream of a pump for a liquid.

If the separator has a plurality of outer portions, then the outer portions may be positioned symmetrically around the inner portion. Alternately, the outer portions may be positioned non-symmetrically around the inner portion. In another embodiment, the outer portions extend contiguously around the inner portion.

The transverse cross-sectional area of the outer portion may be less than the transverse cross sectional area of the inner portion, the same as the transverse cross sectional area of the inner portion or greater than the transverse cross sectional area of the inner portion.

In a further embodiment, the outer portion comprises a helix.

In accordance with a further embodiment of the instant invention, there is provided a cyclone separator for separating a material from a fluid comprising a longitudinally extending separator having a wall, the wall having an inner surface and defining an internal cavity within which the fluid rotates when the separator is in use, the inner surface of the wall defined by, in transverse section, a continuous non-circular convex closed path, the cavity having an inner portion positioned within the non-circular convex closed path and at least one outer portion between the inner portion and the non-circular convex closed path.

The longitudinally extending body may have a longitudinal axis and at least a portion of the longitudinal extent of the inner wall of the separator may be defined by a curve swept 360 degrees around the axis along the continuous non-circular convex closed path.

One portion of the continuous non-circular convex closed path may define a dead air space in which a portion of the material settles out from the fluid and the dead air space may have a receiving portion for receiving the material which is separated from the fluid in the portion.

The outer portion of the inner surface of the wall may alternately be defined by, in transverse section, at least two of straight lines. Alternately the outer portion of the inner surface of the wall may alternately be defined by, in transverse section, a plurality of straight lines which approximate a continuous non-circular convex closed path and, preferably, at least five straight lines which approximate a continuous non-circular convex closed path.

By designing a cyclone separator according to the instant invention, the acceleration of the fluid may vary at different locations in the transverse plane of the cyclone. Thus, a cyclone may be designed which will have a good separation efficiency over a wider range of particle sizes than has heretofore been known. Accordingly, one advantage of the present invention is that a smaller number of cyclones may be employed in a particular application than have been used in the past. It will be appreciated by those skilled in the art that where, heretofore, two or more cyclones might have been required for a particular application, that only one cyclone may be required. Further, whereas in the past three to four cyclones may have been required, by using the separator of the instant intention, only two cyclones may be required. Thus, in one embodiment of the instant invention, the cyclone separator may be designed for a vacuum cleaner and may in fact comprise only a single cyclone as opposed to a multi-stage cyclone as is known in the art.

DESCRIPTION OF THE DRAWING FIGURES

These and other advantages of the instant invention will be more fully and completely understood in accordance with the following description of the preferred embodiments of the invention in which.

Figure 1:
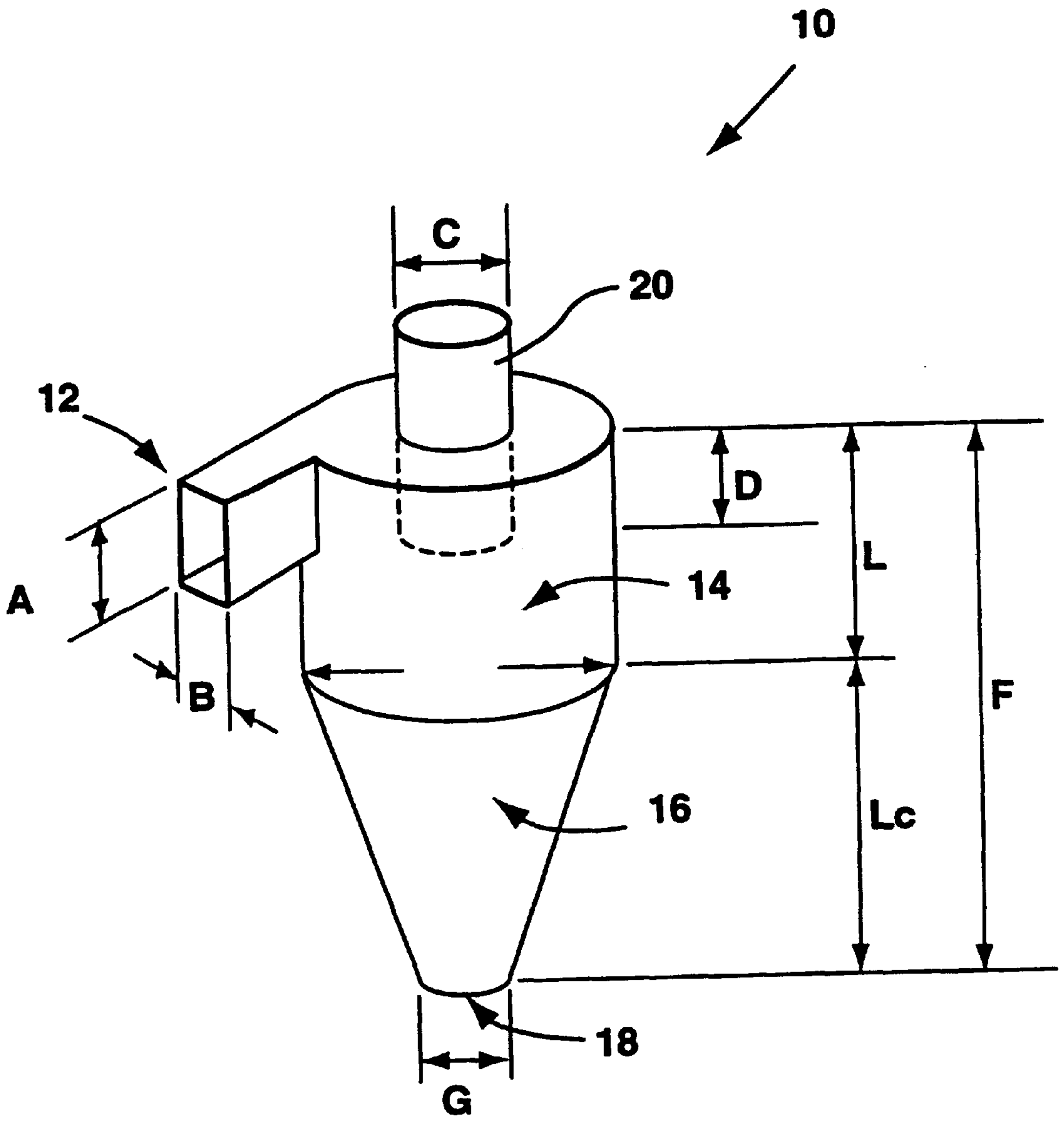
FIG. 1 PRIOR ART
FIG. 1 is a cyclone separator as is known in the art.

FIGS. 8*a*, 9*a*, 10*a*, 11*a*, 12*a*, 13*a*, 14*a*, 15*a*, 16*a*, 17*a*, 18*a*, 19*a*, 20*a*, 21*a*, 22*a*, 23*a*, 24*a*, 25*a*, 26*a*, 27*a*, 28*a*, 29*a*, 30*a*, 31*a*, 32*a*, 33*a*, 34*a*, 35*a*, 36*a*, 37*a*, 38*a* and 39*a* are each a perspective view of a further alternate embodiment of the cyclone separator according to the instant invention;

FIGS. 8*b*, 9*b*, 10*b*, 11*b*, 12*b*, 13*b*, 14*b*, 15*b*, 16*b*, 17*b*, 18*b*, 19*b*, 20*b*, 21*b*, 22*b*, 23*b*, 24*b*, 25*b*, 26*b*, 27*b*, 28*b*, 29*b*, 30*b*, 31*b*, 32*b*, 33*b*, 34*b*, 35*b*, 36*b*, 37*b*, 38*b*, and 39*b* are each the respective top plan view of the cyclone separator shown in FIGS. 8*a*, 9*a*, 10*a*, 11*a*, 12*a*, 13*a*, 14*a*, 15*a*, 16*a*, 17*a*, 18*a*, 19*a*, 20*a*, 21*a*, 22*a*, 23*a*, 24*a*, 25*a*, 26*a*, 27*a*, 28*a*, 29*a*, 30*a*, 31*a*, 32*a*, 33*a*, 34*a*, 35*a*, 36*a*, 37*a*, 38*a* and 39*a*; and, FIGS. 8*c*–8*e*, 9*c*–9*e*, 10*c*–10*e*, 11*c*–11*e*, 12*c*–12*e*, 13*c*–13*e*, 14*c*–14*e*, 15*c*–15*e*, 16*c*–16*e*, 17*c*–17*e*, 18*c*–18*e*, 19*c*–19*e*, 20*c*–20*e*, 21*c*–21*e*, 22*c*–22*e*, 23*c*–23*e*, 24*c*–24*e*, 25*c*–25*e*, 26*c*–26*e*, 27*c*–27*e*, 28*c*–28*e*, 29*c*–29*e*, 30*c*–30*e*, 31*c*–31*e*, 32*c*–32*e*, 33*c*–33*e*, 34*c*–34*e*, 35*c*–35*e*, 36*c*–36*e*, 37*c*–37*e* and 38*c* are each top plan views of variations of the configurations shown in FIGS. 8*a*, 9*a*, 10*a*, 11*a*, 12*a*, 13*a*, 14*a*, 15*a*, 16*a*, 17*a*, 18*a*, 19*a*, 20*a*, 21*a*, 22*a*, 23*a*, 24*a*, 25*a*, 26*a*, 27*a*, 28*a*, 29*a*, 30*a*, 31*a*, 32*a*, 33*a*, 34*a*, 35*a*, 36*a*, 37*a*, 38*a* and 39*a*.

DESCRIPTION OF PREFERRED EMBODIMENT

As shown in FIGS. 2, 5, 6 and 7, cyclone separator 30 comprises a longitudinally extending body having a top end 32, a bottom end 34, fluid inlet port 36, a fluid outlet port 38 and a separated material outlet 40.

Figure 5:
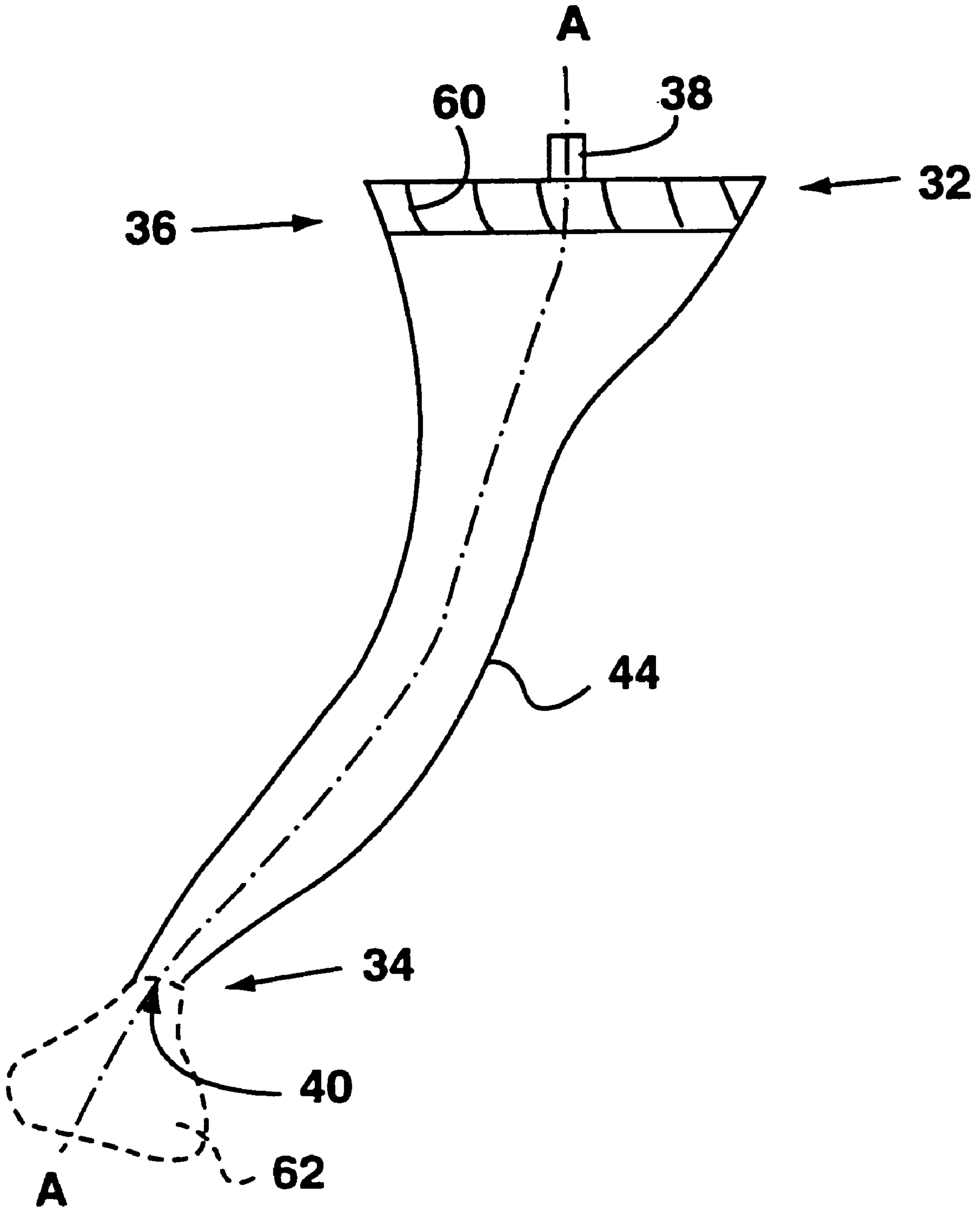
FIG. 5 is an elevational view of a first alternate embodiment of the cyclone separator of FIG. 2.

Cyclone separator 30 has a wall 44 having an inner surface 46 and defining a cavity 42 therein within which the fluid rotates. Cyclone separator 30 has a longitudinally extending axis A—A which extends centrally through separator 30. Axis A—A may extend in a straight line as shown in FIG. 2 or it may be curved or serpentine as shown in FIG. 5.

Figure 2:
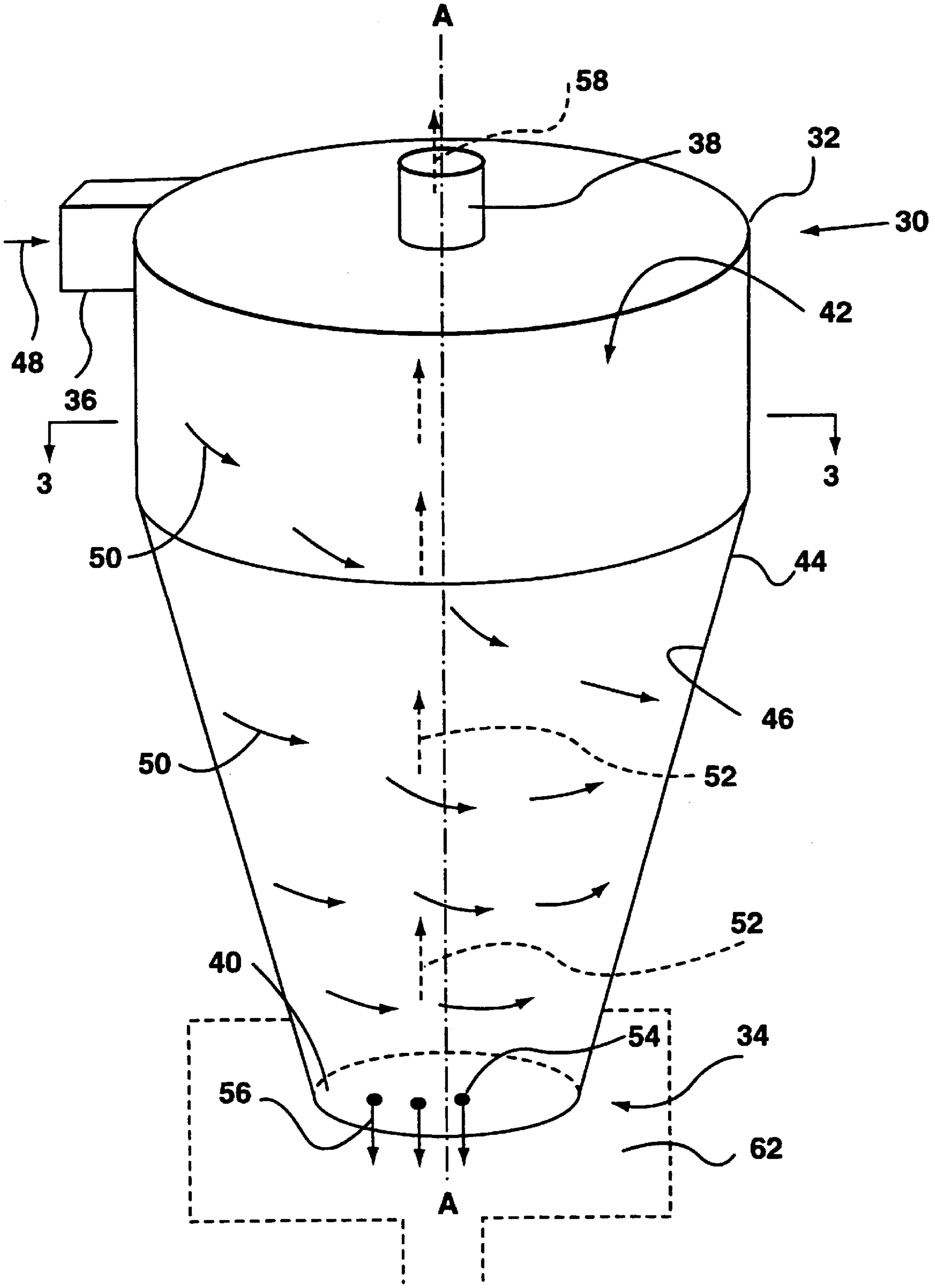
FIG. 2 is a perspective view of a cyclone separator according to the instant invention.
Figure 6:
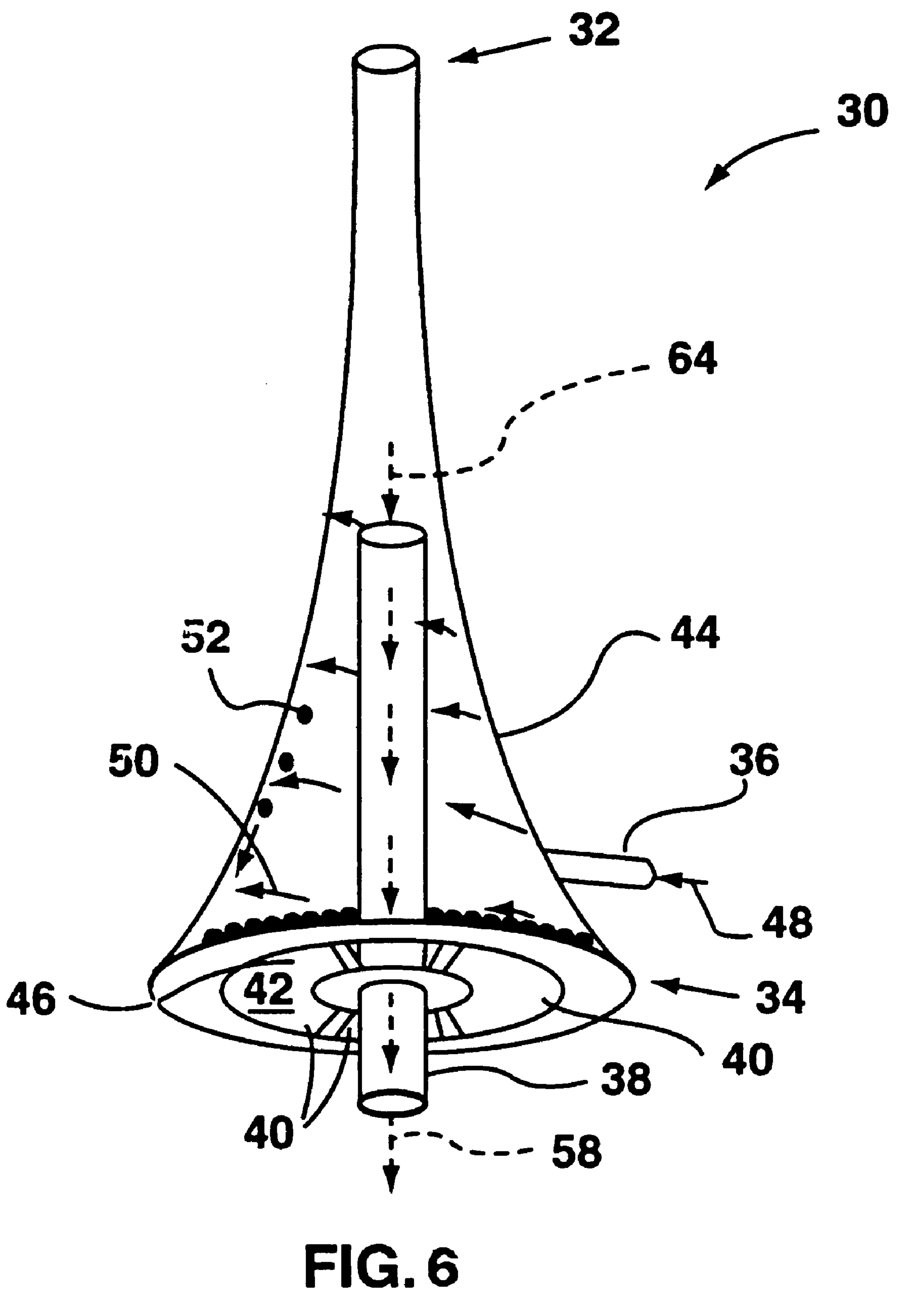
FIG. 6 is a second alternate embodiment of the cyclone separator of FIG. 2.

As shown in FIG. 2, cyclone separator 30 is vertically disposed with the fluid and material to be separated entering cyclone separator 30 at a position adjacent top end 32. As shown in FIG. 6, cyclone separator 30 is again vertically disposed but inverted compared to the position show in FIG. 2. In this embodiment, fluid 48 enters cyclone separator 30 at a position adjacent bottom end 34 of the separator. It will be appreciated by those skilled in the art that provided the inlet velocity of fluid 48 is sufficient, axis A—A may be in any particular plane or orientation, such as being horizontally disposed or inclined at an angle.

Fluid 48 may comprise any fluid that has material contained therein that is capable of being removed in a cyclone separator. Fluid 48 may be a gas or a liquid. If fluid 48 is a gas, then fluid 48 may have solid particles and/or liquid particles and/or a second gas contained therein such as by being suspended, mixed or entrained therein. Alternately, if fluid 48 is a liquid, it may have solid particles and/or a second liquid and/or a gas contained therein such as by being suspended, mixed or entrained therein. It will thus be appreciated that the cyclone separator of the instant invention has numerous applications. For example, if fluid 48 is a gas and has solid particles suspended therein, then the cyclone separator may be used as the filter media in a vacuum cleaner. It may also be used as a scrubber for a smoke stack so as to remove suspended particulate matter such as fly ash therefrom. It may also be used as pollution control equipment, such as for a car, or to remove particles from an inlet gas stream which is fed to turbo machinery such as a turbine engine.

If fluid 48 is a gas and contains a liquid, then cyclone separator 30 may be used as a mist separator.

If fluid 48 is a mixture of two or more liquids, then cyclone separator 30 may be used for liquid/liquid separation. If fluid 48 is a liquid and has a gas contained therein, then cyclone separator 30 may be used for gas/liquid separation. If fluid 48 is a liquid which has solid particles contained therein, then cyclone separator 30 may be used for drinking water or waste water purification.

In the preferred embodiment shown in FIG. 2, fluid 48 enters cyclone separator through inlet port 36 and tangentially enters cavity 42. Due to the tangential entry of fluid 48 into cavity 42, fluid 48 is directed to flow in a cyclonic pattern in cavity 42 in the direction of arrows 50. Fluid 48 travels in the axial direction in cavity 42 from fluid entry port 36 to a position adjacent bottom end 34. At one point, the fluid reverses direction and flows upwardly in the direction of arrows 52 while material 54 is separated from fluid 48 and falls downwardly in the direction of arrows 56. Treated fluid 58, which has material 54 separated therefrom, exits cyclone separator 30 via outlet port 38 at the top end 32 of cavity 42.

Figure 7:
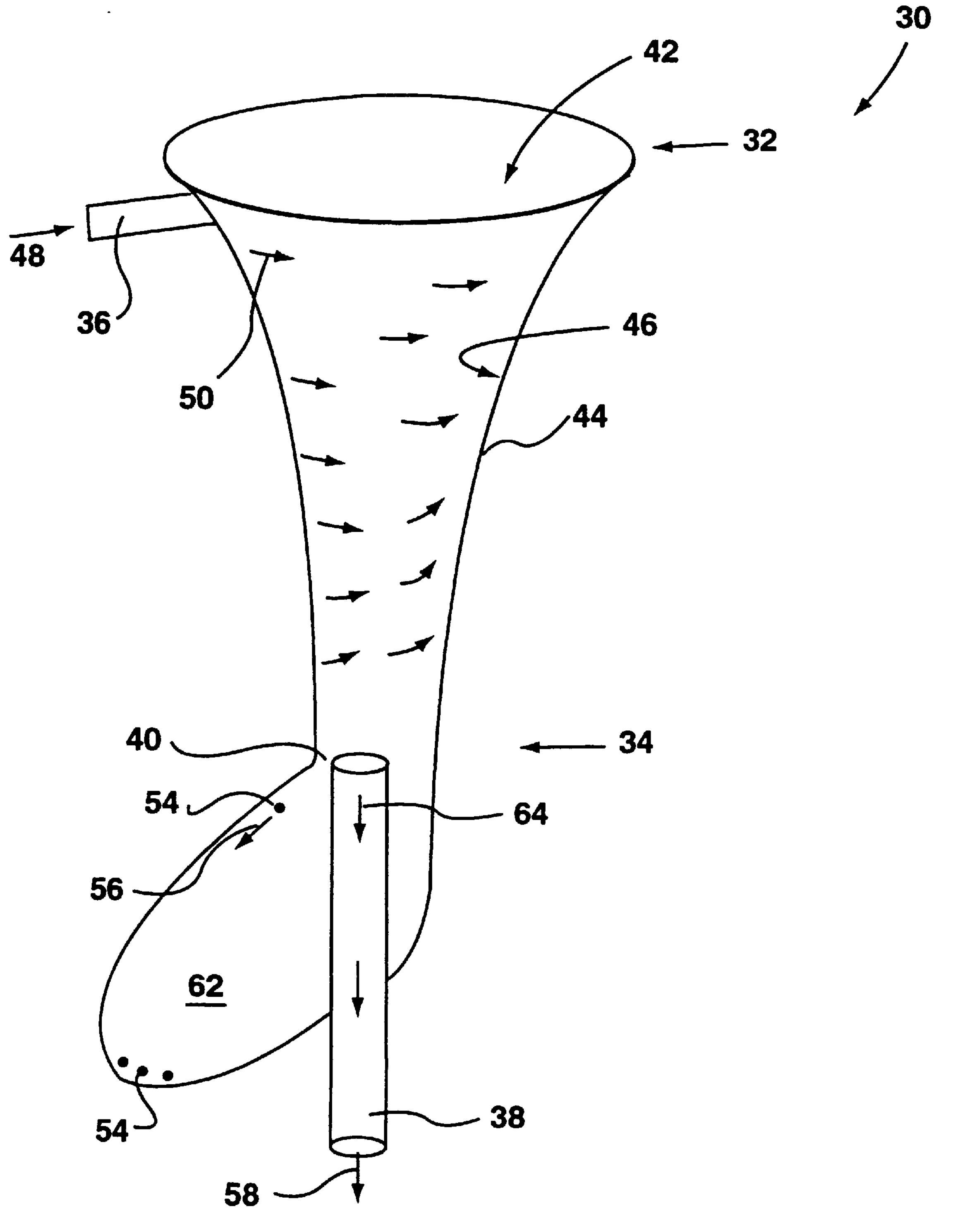
FIG. 7 is a third alternate embodiment of the cyclone separator according to the instant invention.

In the alternate embodiment shown in FIG. 7, cyclone separator 30 may be a unidirectional flow cyclone separator. The cyclone separator operates in the same manner as described above with respect to the cyclone separator 30 shown in FIG. 2 except that fluid 48 travels continuously longitudinally through cavity 42. Material 54 is separated from fluid 48 and travels downwardly in the direction of arrows 56. Treated fluid 58, which has material 54 separated therefrom, continues to travel downwardly in the direction of arrows 64 and exits cyclone separator 30 via outlet port 38 at a position below bottom end 34 of cavity 42.

Figure 4:
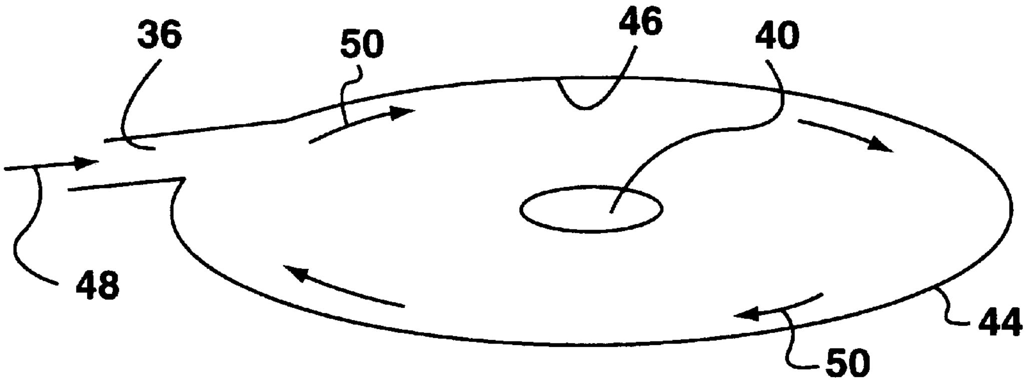
FIG. 4 is a top plan view of the cyclone separator of FIG. 2.

As shown in FIG. 4, fluid 48 may enter cavity 42 axially. In such a case, fluid entry port 36 is provided, for example, at top end 32 of cyclone separator 30. A plurality of vanes 60 are, preferably, provided to cause fluid 48 to flow or commence rotation within cavity 42. It would be appreciated by those skilled in the art that fluid 48 may enter cavity 48 from any particular angle provided that fluid entry port 36 directs fluid 48 to commence rotating within cavity 42 so as to assist in initiating or to fully initiate, the cyclonic/swirling motion of fluid 48 within cavity 42.

Referring to FIG. 6, cyclone separator 30 is vertically disposed with fluid entry port 36 positioned adjacent bottom end 34. As fluid 48 enters cavity 42, it rises upwardly and is subjected to a continuously varying acceleration along inner surface 46 of cavity 42. Gravity will tend to maintain the contained material (if it is heavier) in the acceleration region longer thereby enhancing the collection efficiency. At some point, the air reverses direction and flows downwardly in the direction of arrow 64 through exit port 38. Particles 54 become separated and fall downwardly to bottom end 34 of cyclone separator 30. If bottom end 34 is a contiguous surface, then the particles will accumulate in the bottom of cyclone separator 30. Alternately, one or more openings 40 may be provided in the bottom surface of cyclone separator 30 so as to permit particles 54 to exit cyclone separator 30.

It will also be appreciated that cyclone separator 30 may have a portion thereof which is designed to accumulate separated material (for example, if the bottom surface of the cyclone separator FIG. 6 were sealed) or, if the bottom of cyclone separator 30 of FIG. 5 had a collection chamber 62 (which is shown in dotted outline) extend downwardly from outlet 40 (see also FIG. 7). Alternately, outlet 40 may be in fluid communication with a collection chamber 62. For example, as shown in FIG. 2, collection chamber 62 is positioned at the bottom of and surrounds outlet 40 so as to be in fluid communication with cyclone separator 30. Collection chamber 62 may be of any particular configuration to store separated material 54 (see FIG. 7) and/or to provide a passage by which separated material 54 is transported from cyclone separator 30 (see FIG. 2) provided it does not interfere with the rotational flow of fluid 48 in cavity 42.

In order to allow cyclone separator 30 to achieve a good separation efficiency over a wider range of small particle sizes, cavity 42 has an inner portion 66 in which the fluid rotates when the separator is in use and at least one outer portion 68 positioned external to the inner portion 66 and contiguous therewith. The outer portion of cavity 42 extends outwardly from inner portion 66 of cavity 42 and defines a zone in which at least a portion of fluid 48 expands outwardly as it rotates in the plane defined by the transverse section. Accordingly, the portion of the fluid which expands into the outer portion of the cavity has different fluid flow characteristics compared to those of the fluid rotating in the inner portion of the cavity, which promote the separation of the material from the fluid.

In one embodiment, inner surface 46 of wall 44 is configured in the plane transverse to axis A—A (as exemplified in FIG. 3) to impart changes in the rate of acceleration of the fluid as it rotates within cavity 42. In another embodiment, inner surface 46 of wall 44 is configured to continuously impart changes in the rate of acceleration to the portion of the fluid as it rotates in the plane defined by the transverse section. In another embodiment, inner surface 46 of wall 44 is configured to impart to the portion of the fluid a different speed, a different direction of travel or a different velocity compared to that of the fluid rotating in the inner portion of the cavity.

The outer portion 68 is configured to impart changes in the speed, direction of travel or rate of acceleration of fluid 48 as it rotates in cavity 42 in addition to those imparted by the portion of wall 44 which surrounds inner portion 66 thus promoting the separation of contained material. The interaction may also spawn one or more second cyclones 74 which separate the contained material in the same manner as the main cyclone and/or one or more dead air spaces 72 (low velocity zones) in which the separated material may travel to a collecting chamber 62 without undue re-entrainment.

Figure 3:
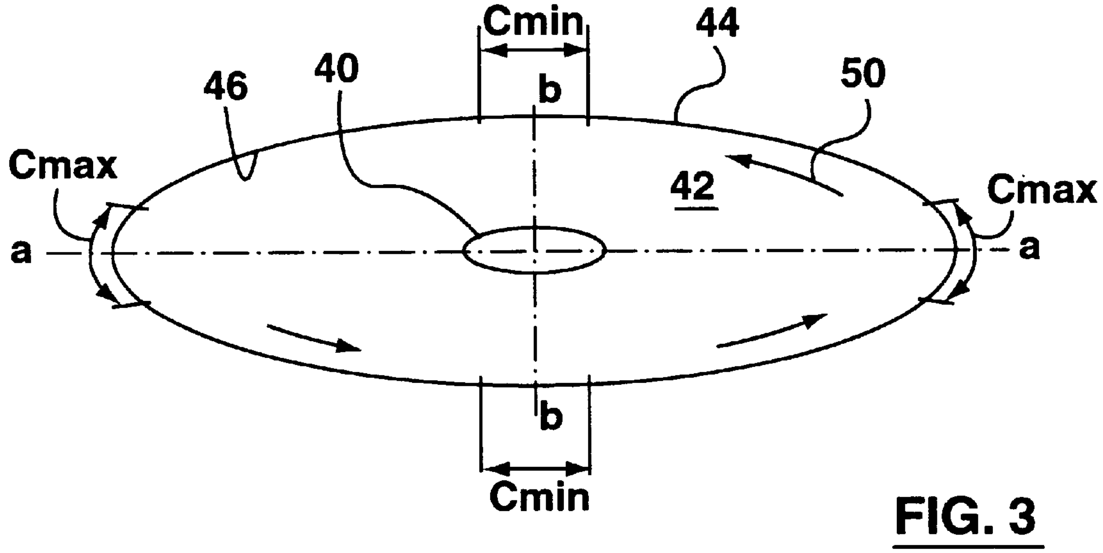
FIG. 3 is a cross-section of the cyclone separator of FIG. 2 taken along the line 3—3.

In the preferred embodiment shown in FIG. 3, cavity 42 is elliptical in transverse section and has a major axis a—a and a minor axis b—b. Cyclone separator 30 may have a longitudinally extent which is defined by a curve swept 360° around the axis A—A along this continuous non-hyphen circular convex closed path. The portion of maximum curvature of inner surface 46 in the transverse plane is denoted by $C_{max}$ and the portion of minimum curvature of inner surface 46 in the transverse plane is denoted by $C_{min}$. By allowing fluid 48 to be subjected to varying acceleration as it rotates in the transverse plane, different size particles may be separated from fluid 48 at different portions along the circumference of wall 44 of cyclone separator 30. For example, the acceleration of fluid 48 would increase along sector $C_{max}$ of cyclone separator 30 and particles having a different density would be separated at this portion of the circumference. Similarly, for example, the acceleration of fluid 48 would decrease along sector $C_{min}$ of cyclone separator 30 and particles having a different density would be separated at this portion of the circumference. A boundary or prank layer which exists along inner surface 46 of wall 44 provides a low flow or a low velocity zone within which the separated material may settle and not be re-entrained by the faster moving air rotating within cavity 42.

As will be appreciated, the more changes in the rate of acceleration of fluid 48 as it spins around wall 44, the greater the separation efficiency of cyclone separator 30. While inner surface 46 may have a plurality of different shapes to effect such changes in the rate of acceleration, inner surface 46 is configured so as to not disrupt the cyclonic flow of fluid 48 in cavity 42.

As shown in FIGS. 8(*a*)–(*e*) through 39(*a*), (*b*), various alternate embodiments of outer portion 68 may be used. Referring to FIG. 8*a*, cavity 42 has an inner portion 66 and one outer portion 68. As shown in FIG. 8*b*, outer portion 68 has a cross sectional area which is smaller than the cross sectional area of inner portion 66. Outer portion 68 is contiguous with inner portion 66 such that inner cavity 42 is defined by wall 44 which surrounds both inner portion 66 and outer portion 68 except where they intercept. Further, as shown in FIG. 8*a*, inner portion 66 and outer portion 68 have the same length and are coterminus (i.e. that is they both commence adjacent upstream end of cavity 42 and they both terminate adjacent the downstream end of cavity 42.

As second cyclone 74 results in a pressure drop in cyclone separator 30, the number and size of second cyclones 74 is preferably selected to produce the desired separation with an acceptable pressure drop. For example, if incoming fluid 48 contains a large particle load and/or fine particles to be separated, then it is preferred to configure outer portion 68 to spawn one or more second cyclones 74. As the particle load increase, or the particle size decreases, then it is preferred to configure outer portion 68 to produce an increased number of second cyclones 74. Further, as the size of the particles to be separated decreases, then it is preferred to configure outer portion 68 to spawn one or more cyclones having a smaller diameter.

Figure 8B:
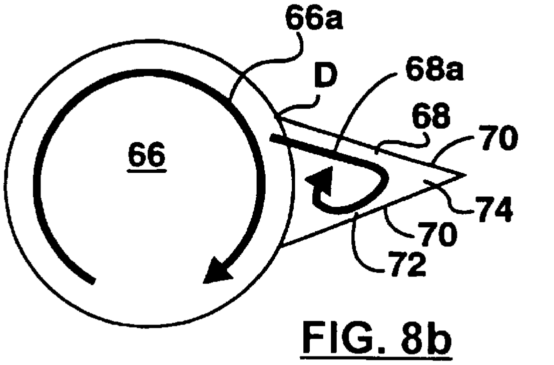

Inner portion 66 defines the portion of cavity 42 within which fluid 48 circulates in a cyclonic or a swirling pattern as is generally represented by arrow 66*a* in FIG. 8*b*. As fluid 48 rotates in inner portion 66, at least a portion expands outwardly into outer portion 68 as shown by arrow 68*a* in FIG. 8*b*. When fluid 48 enters outer portion 68, fluid 48 undergoes a change in its rate of acceleration. In particular, fluid 48 would have a tendency to slow down as it enters and travels through outer portion 68. As fluid 48 slows down, the material which is contained in fluid 48 would, if it is denser, change speed at a slower rate than fluid 48 and would continue on such that some or all of it would impact against wall 70 of outer portion 68. Once separated, separated material 54 may travel in the downward direction within the boundary or prank layer which would exist along inner surface 46 of wall 70.

Figure 8C:
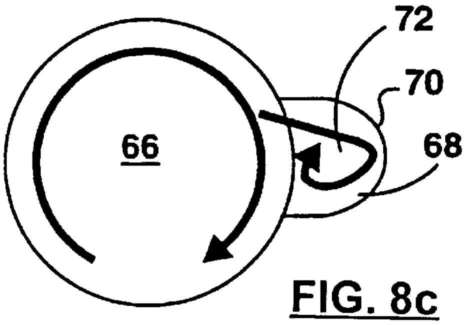

Outer portion 68 may be configured to interact with the portion of fluid 48 which enters outer portion 68 to cause the portion, or at least part thereof, to rotate to define at least one second cyclone 72 exterior to the cyclone in inner portion 66. An example of such a configuration is shown in FIG. 8*c*. Since outer portion 68 is generally circular in shape, second cyclone 72 would travel past all of the interior surface of wall 70 of outer portion 68, the same as fluid 48 swirls past the portion of inner surface 46 which surrounds inner portion 66. In this embodiment, it is particularly preferred if the second or outer cyclone rotates in the reverse direction to the cyclone of inner portion 66. Second cyclones 74 may be generated by configuring wall 70 to create a local pressure differential within outer portion 68. Such local pressure differentials may be created by shearing fluid 48 over the discontinuities in wall 70, such as point D in FIG. 8(*b*) where there is a discontinuity where wall 70 commences or by boundary layer delamination when the Reynolds number >3,000.

Figure 8D:
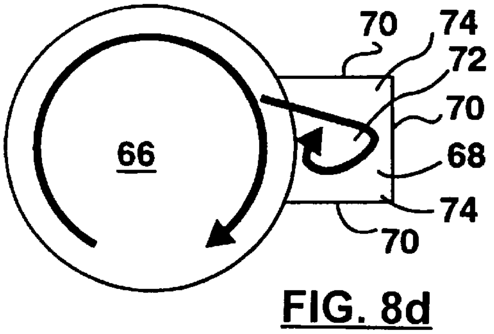
Figure 8E:
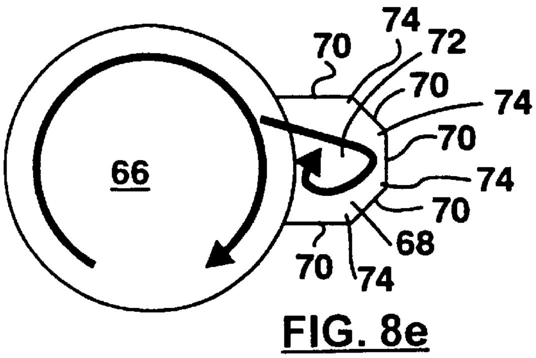

In an alternate embodiment, outer wall 70 may be configured to interact with the portion of fluid 48 which enters outer portion 68 to create a dead air space 74 in outer portion 68 and, as well, to cause fluid 48 to define at least one second cyclone 72 in the outer portion 68 (see FIGS. 8*b*, 8*d* and 8*e*). As fluid 48 rotates in inner portion 68 of FIG. 8*b*, it will not travel into the corner of outer portion 68 which is triangular in shape. Thus, the apex of the triangle where walls 70 meet define a dead air space 74 (a region of low velocity or low flow). Dead air space 74 is an area in outer portion 68 within which the separated material may travel to bottom end 32 without substantial re-entrainment and, preferably, without any significant re-entrainment. The creation of dead air spaces 74 are beneficial if fluid 48 has a large load of contained material which is to be removed by one or more cyclone separators 30. It will be appreciated that in outer portion 68, a plurality of second cyclones 74 may be created.

In a further alternate embodiment, outer portion 68 may be constructed to define only a dead air space. According to this embodiment, when fluid 48 enters outer portion 68, its rate of travel would diminish sufficiently so that the entrained material, which has a different density, would become separated from fluid 48 and may settle downwardly through outer portion 68 without re-entrainment, or at least substantial re-entrainment, of material 54 into fluid 48 in outer portion 68.

Outer portion 68 may have a variety of shapes. For example, as shown in FIG. 8*c*, outer portion 68 is circular except where it intersects with inner portion 66. As shown in FIG. 8*d*, outer portion 68 is square except where it intersects with inner portion 66. As shown in FIG. 8*e*, outer portion 68 is a five cited polygon. It would be appreciated that outer portion 68 may also be in the shape of a hexagon, octagon or other closed convex shape.

FIGS. 9*a*–9*e* show a similar outer portion 68 to that shown in FIGS. 8*a*–8*e* respectively except that outer portion 68 is not centered radially outwardly from inner portion 66 but is offset so as to define entry 76 into outer portion 68. Accordingly, as fluid 48 circulates within inner portion 66, a portion of it will continue along wall 44 into entry area 76. Entry area 76 may function as a tangential entry port thus assisting the creation of at least one second cyclone 72 within outer portion 68. It will be appreciated that second cyclone 72 may be a rapidly rotating cyclone similar to the cyclone in inner portion 66 whereby second cyclone 72 is designed to promote the separation of material contained in fluid 48. Alternately, second cyclone 72 may be a relatively slow moving cyclone which is designed to create a fluid stream which entrains the material which is separated from fluid 48 by the cyclone in inner portion 66 and to transport the separated material 54 downstream to a positioning external to cavity 42 such as a collecting chamber 62.

FIGS. 10*a*–10*e* show an alternate embodiment of the configurations of cavity 42 shown in FIGS. 8*a*–8*e*. In this series of drawings, two outer portions 68 are provided around inner portion 66. These two outer portions 68 are symmetrically positioned around inner portion 66 and are positioned so as to be radially aligned on opposed sides of inner portion 66. Further, the cross sectional area of both outer portions 68 is less than the cross sectional area of inner portion 66. One advantage of this embodiment is that two independent outer portions are created so as to increase the separation efficiency of cyclone separator 30. FIGS. 11*a*–11*e* show a similar variation wherein there are three outer portions 68 and FIGS. 12*a*–12*e* show a further similar variation wherein there are four symmetrically positioned outer portions 68. It will be appreciated that any number of outer portions 68 may be positioned around inner portion 66 provided wall 44 is configured to impart different flow characteristics to fluid 48 in outer portions 68.

Figure 13B:
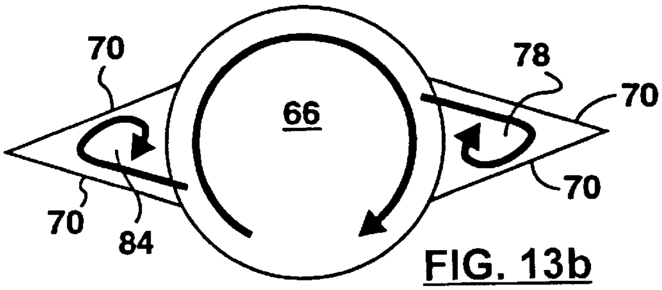
Figure 13C:
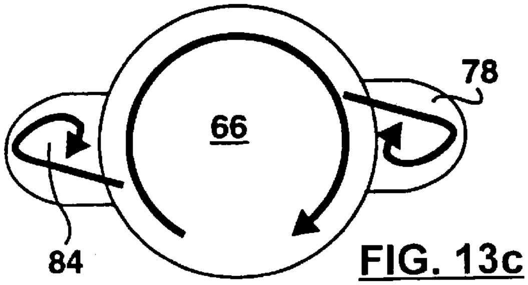
Figure 13D:
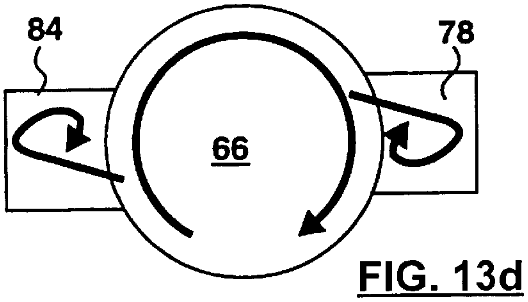
Figure 13E:
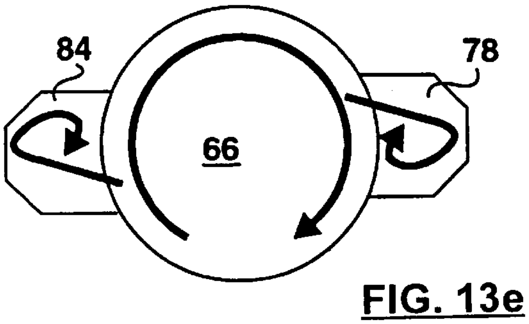
Figure 13A:
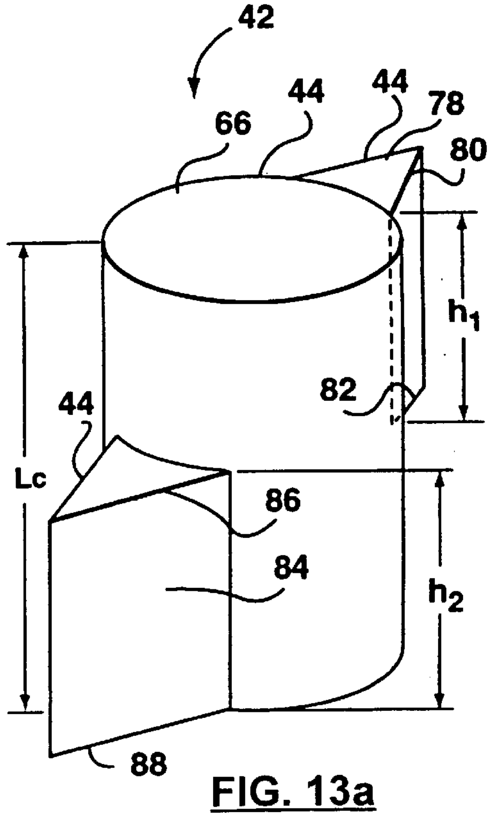

As shown in FIG. 13*a*, cavity 42 may have an inner portion 66, an upper outer portion 78 and a lower outer portion 84. Upper outer portion 78 has an upstream end 80 and a downstream end 82. Similarly, lower outer portion 84 has an upstream end 86 and a downstream end 88. As shown in FIG. 13*b*, while the outer portions are staggered, they are positioned symmetrically around inner portion 66. Upper outer portion 78 has a longitudinal height h1 and lower outer portion 84 has a longitudinal height h2. H1 may be the same and/or different to h2. Further, upstream end 86 of lower portion 84 may be positioned at any position along the longitudinal height F of inner portion 66. For example, as shown in FIG. 13*a*, upstream end 86 is positioned at the same longitudinal position as downstream end 82 of upper outer portion 78 and, accordingly, an outer portion is provided along the entire longitudinal length F of inner portion 66. However outer portions 78 and 84 are staggered and symmetrically positioned around inner portion 66. It will be appreciated that lower outer portion 84 may commence and end at any position of length F of inner portion 66 relative to upper outer portion 78. For example, upstream end 86 may be positioned above downstream end 82. A plurality of outer portions may also be provided, each of which commences and ends at a different position along the longitudinal length F of inner portion 66. As shown in FIGS. 13*a*–13*e*, outer portions 78, 84 may have any particular configuration and my be offset as discussed above.

It will also be appreciated that the outer portions need not extend along the entire longitudinal length F of cyclone separator 30. In one embodiment, the outer portion or outer portions may be provided for only a portion of the longitudinal length F of inner portion 66.

If two or more outer portions 68 are used, each of which has a different configuration, then different second cyclones 74 may be created, each of which is designed to remove particles having a different size distribution. Thus second cyclones 74 which have a different $d_{50}$ value may be produced. It will be appreciated that if the outer portions have different transverse sections, then second cyclones 74 having different $d_{50}$ values may be created along the same length of inner portion 66. Alternately a portion of the longitudinal length of inner portion 66 may have a plurality of outer portions, each of which may create one or more second cyclone 74 having the same $d_{50}$ value and different longitudinal lengths of inner portion 66 are used to spawn second cyclones 74 having a different $d_{50}$ value.

Figure 14B:
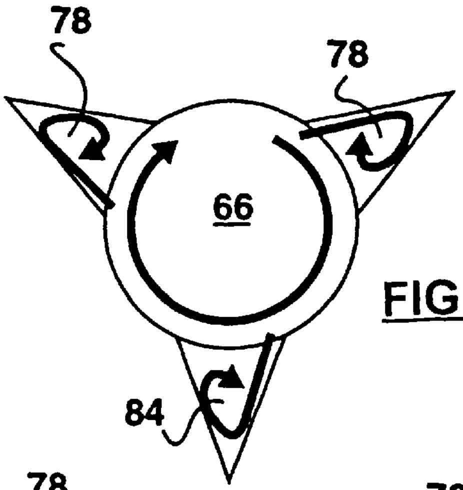
Figure 14C:
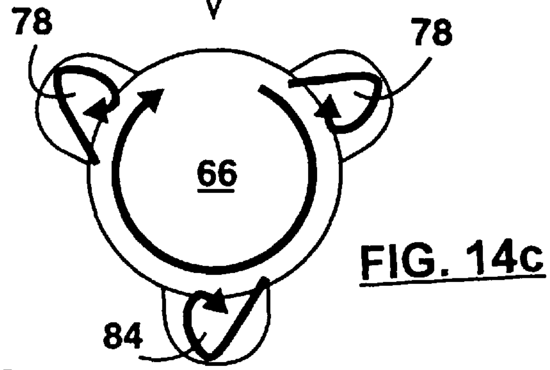
Figure 14D:
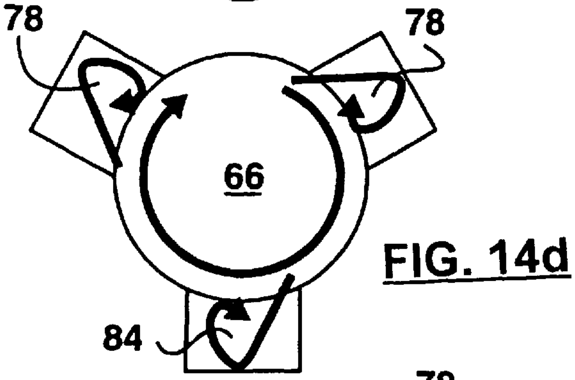
Figure 14E:
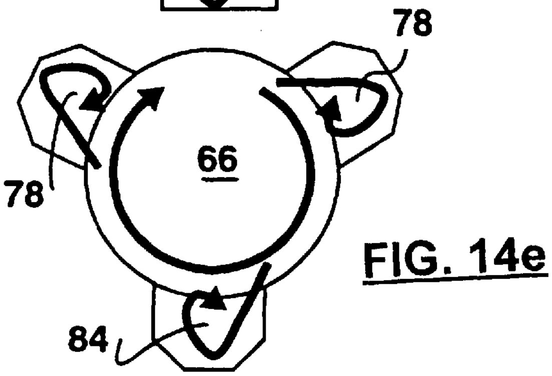
Figure 14A:
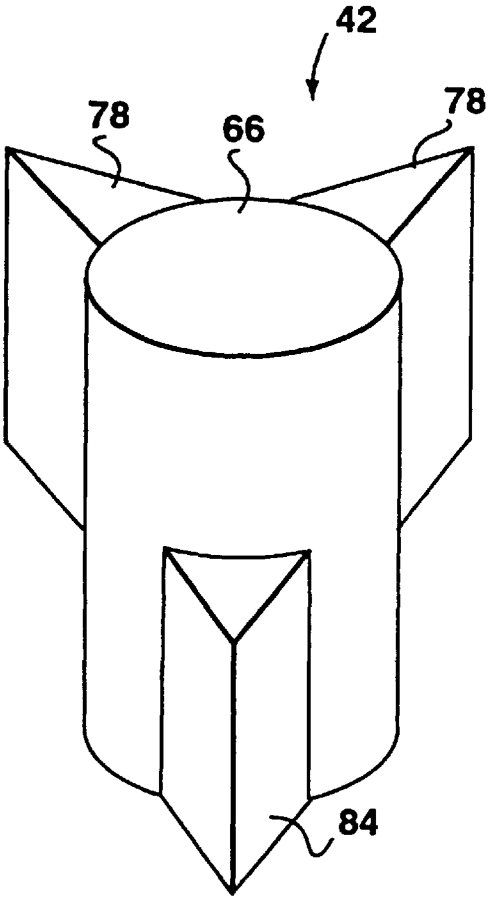

FIGS. 14*a*–14*e* show a series of drawings in which three outer portions are provided. As shown in FIG. 14*a*, two upper outer portions 78 and one lower outer portion 84 are provided symmetrically around inner portion 66. It will be appreciated that, alternately, two lower outer portions 84 and one upper outer portion 78 might be provided. Alternately, each of the outer portions might be provided at varying distances along the length F of inner portion 66.

Figure 15B:
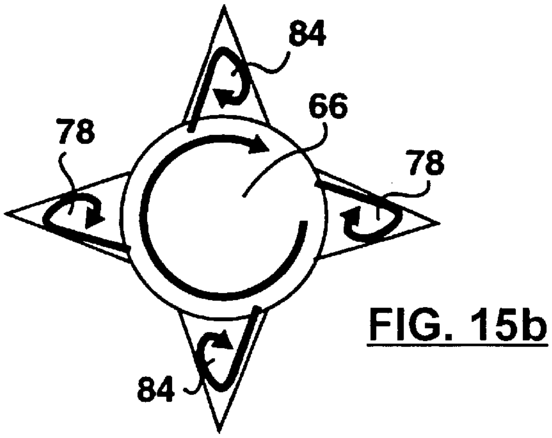
Figure 15C:
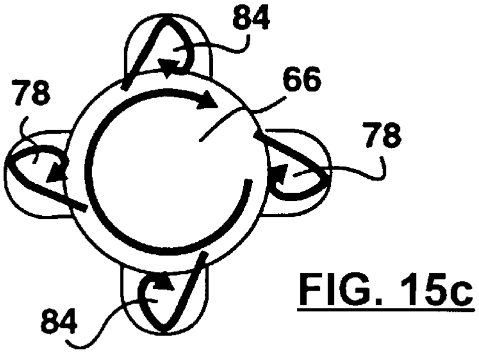
Figure 15D:
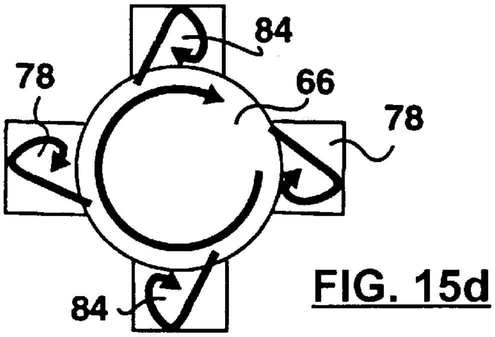
Figure 15E:
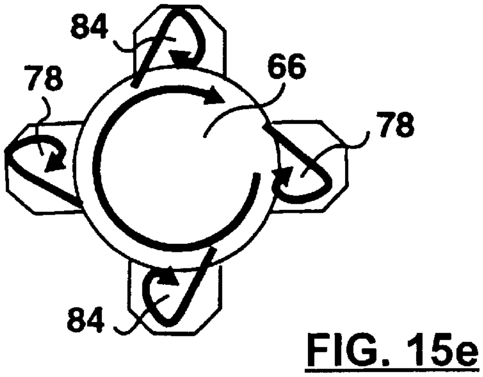
Figure 15A:
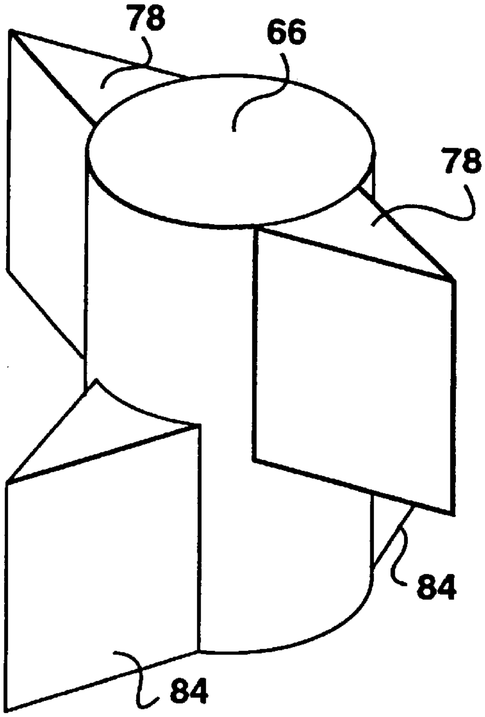

In the series of drawings shown in FIGS. 15*a*–15*e*, four outer portions are provided symmetrically, but at the staggered heights, around inner portion 66. As shown in FIG. 15*a*, two upper outer portions 78 are provided and two lower outer portions 84 are provided. It will be appreciated that three upper portions 78 might be provided and one lower portion 84 might be provided or, alternately, three lower outer portions 84 and one upper outer portion 78 might be provided. Alternately, the outer portions may be at varying heights, and extend for varying distances, along the length F of inner portion 66.

Figure 16B:
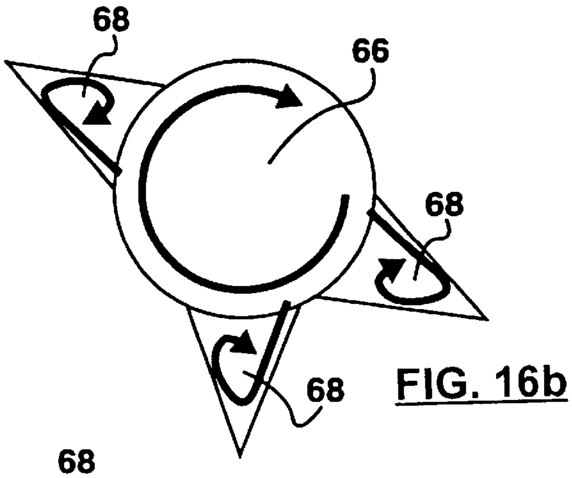
Figure 16C:
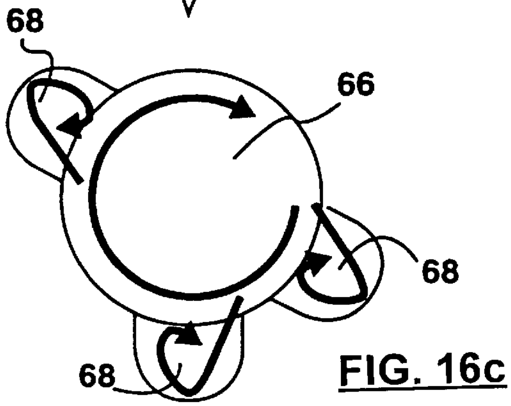
Figure 16D:
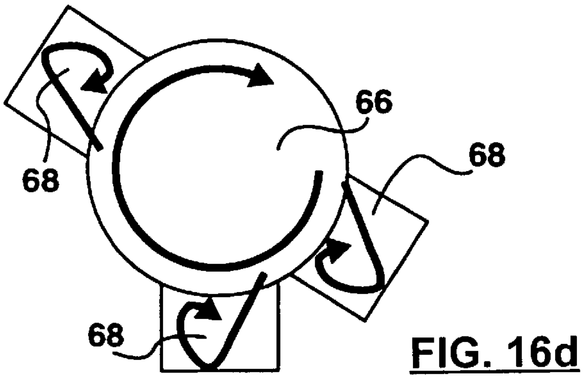
Figure 16A:
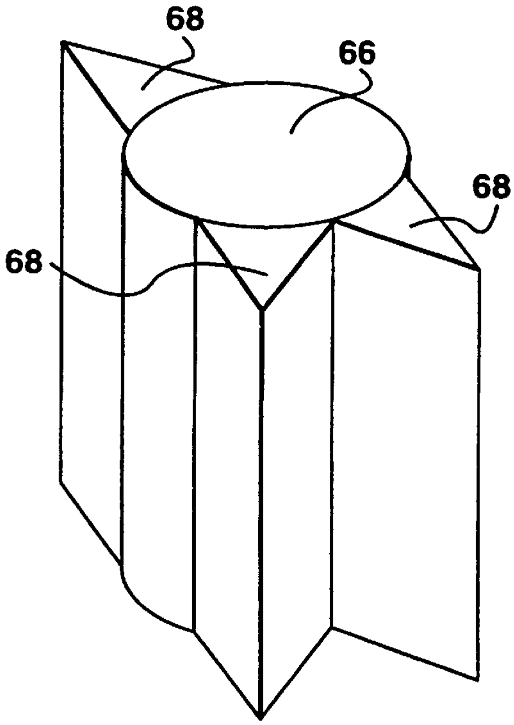
Figure 16E:
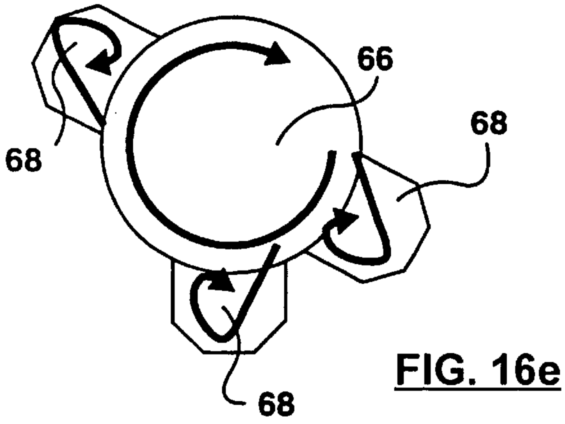
Figure 17B:
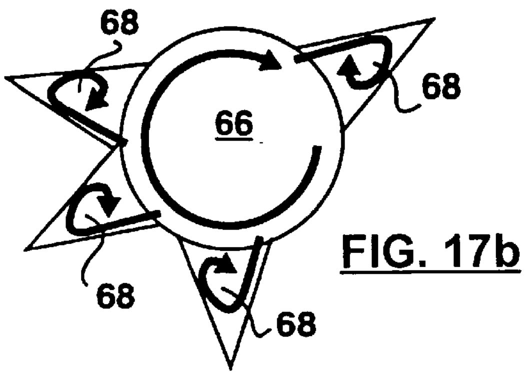
Figure 17C:
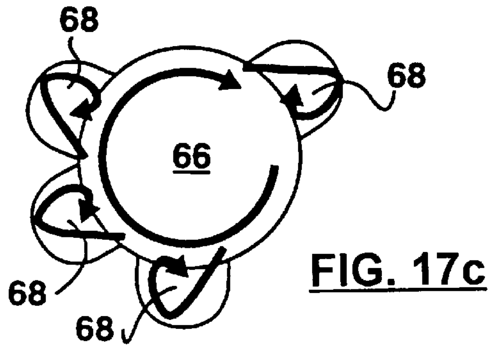
Figure 17D:
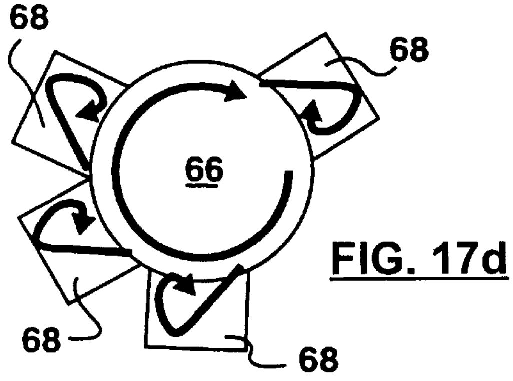
Figure 17E:
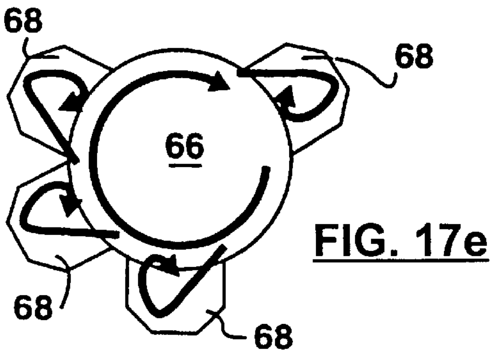
Figure 17A:
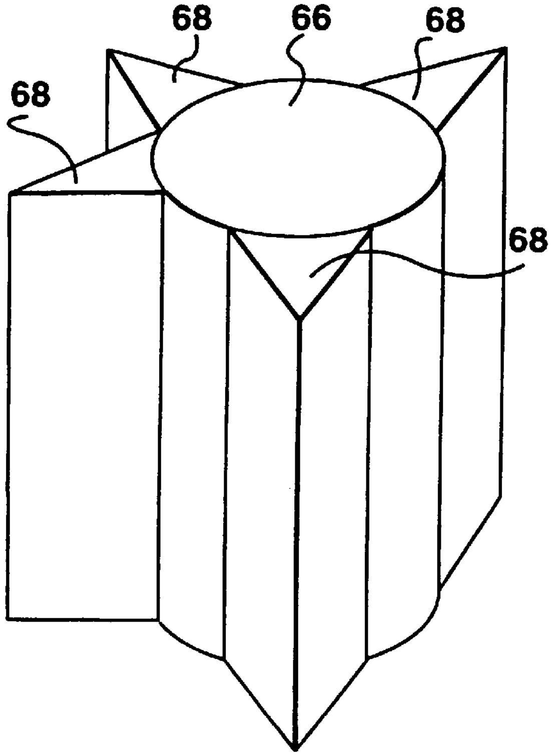
Figure 18B:
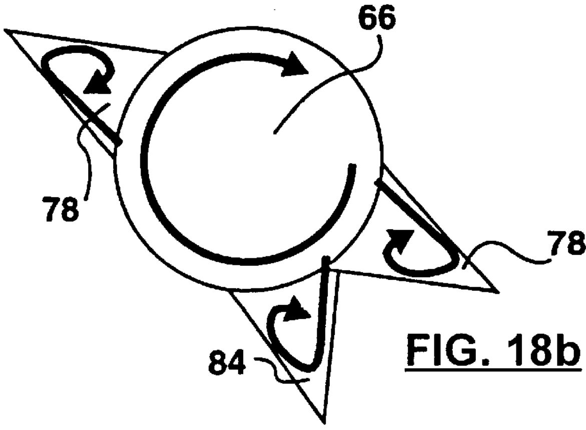
Figure 18C:
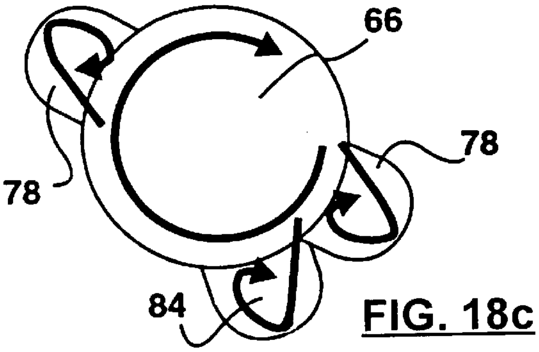
Figure 18D:
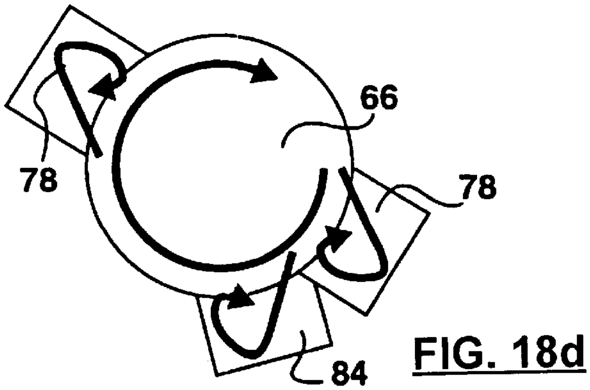
Figure 18E:
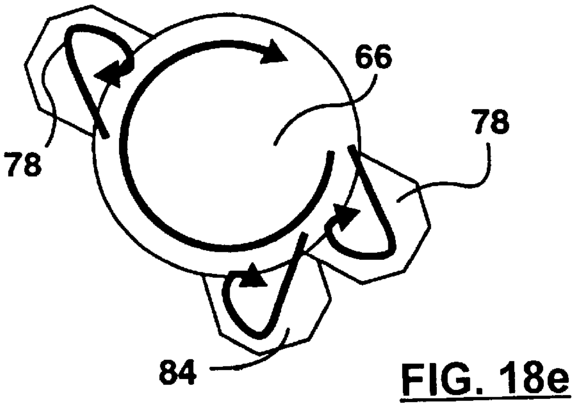
Figure 18A:
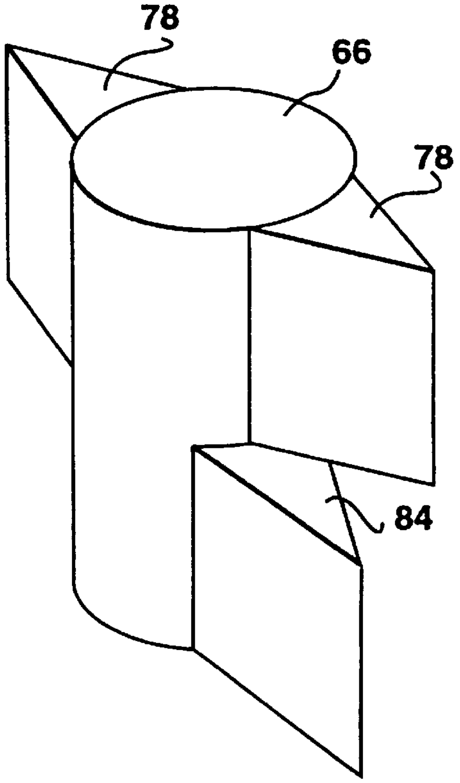
Figure 19B:
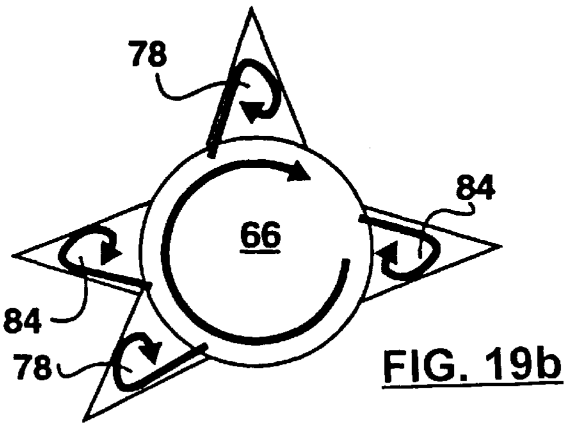
Figure 19C:
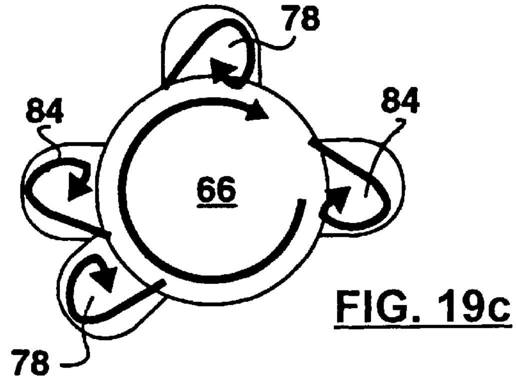
Figure 19D:
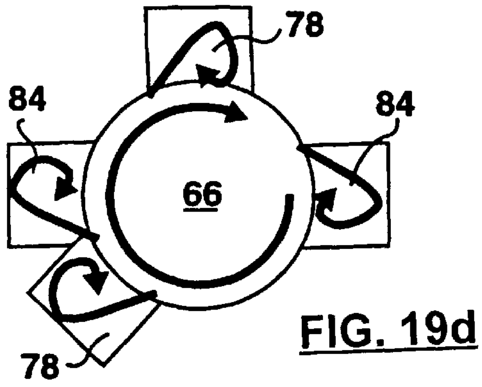
Figure 19E:
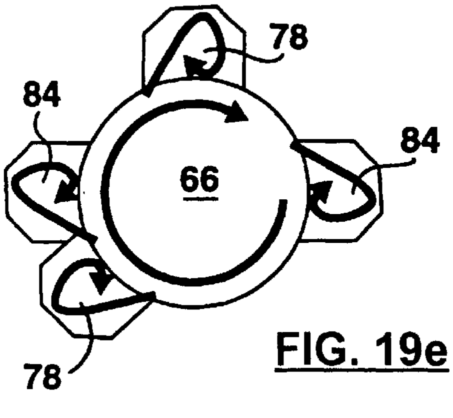
Figure 19A:
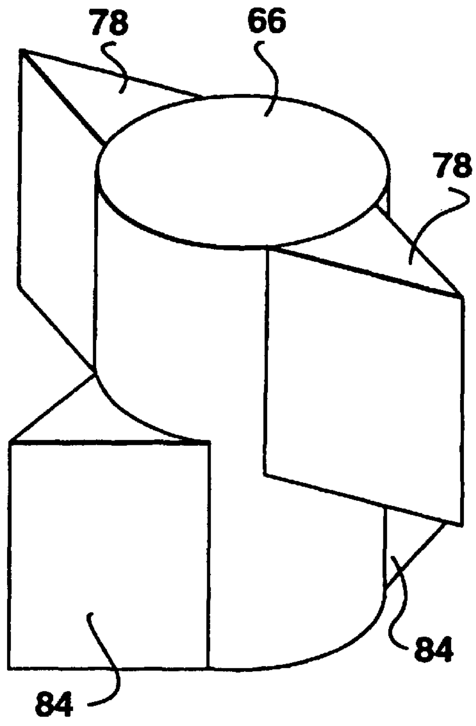
Figure 20B:
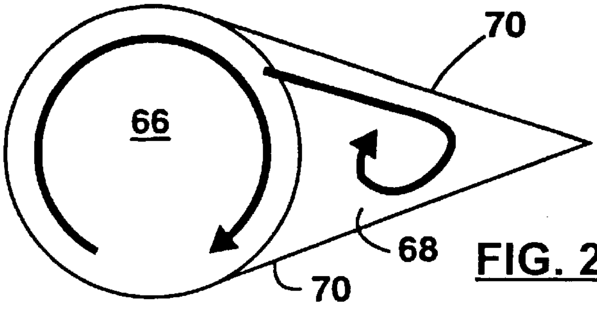
Figure 20A:
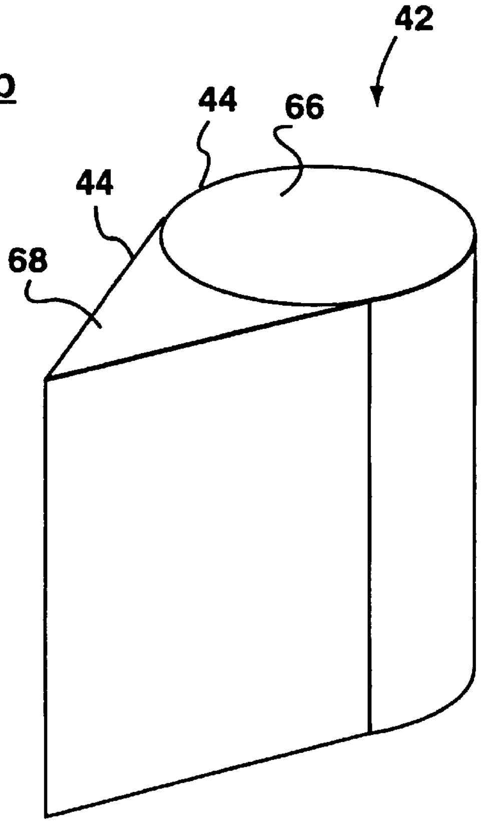
Figure 20C:
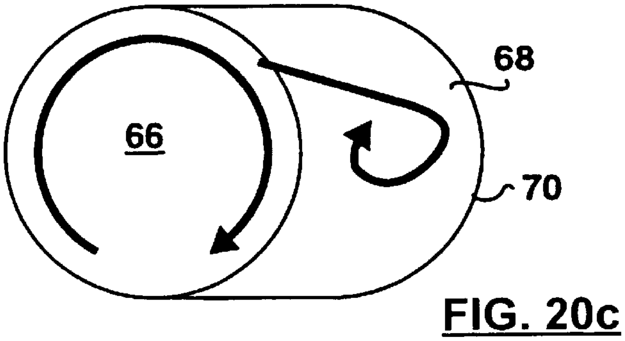
Figure 20D:
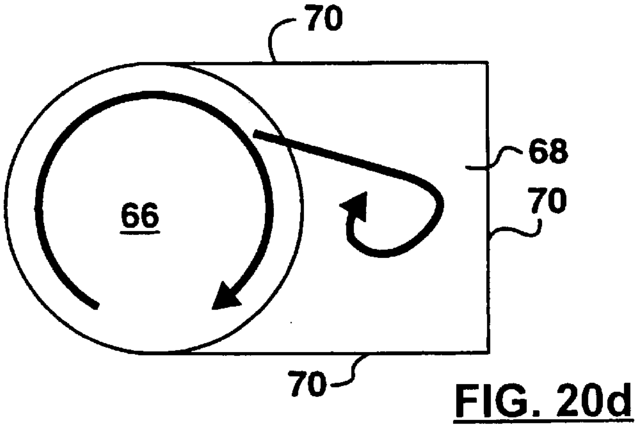
Figure 20E:
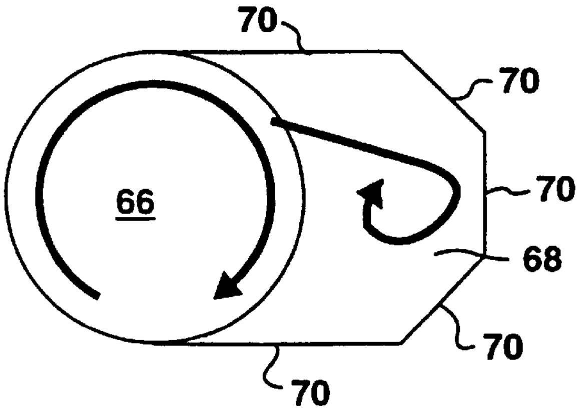
Figure 21B:
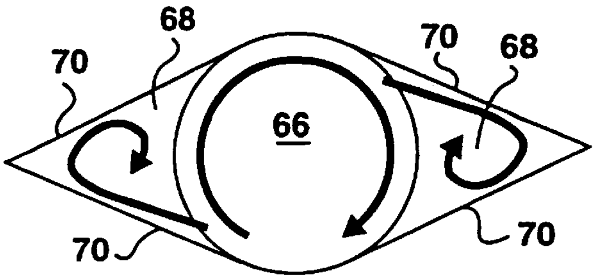
Figure 21C:
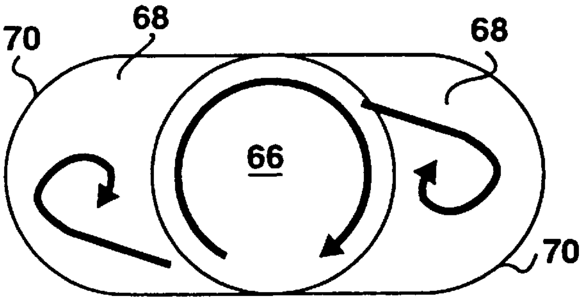
Figure 21D:
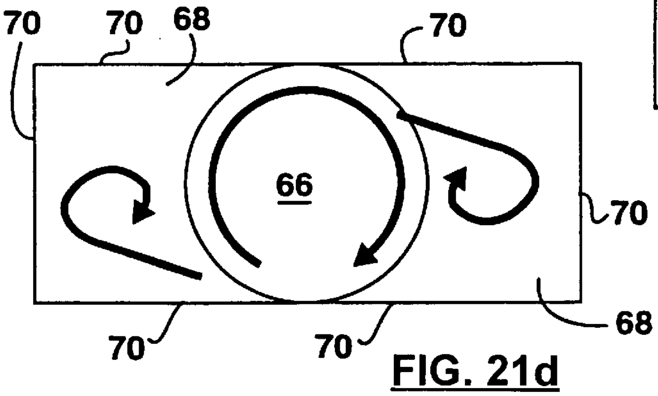
Figure 21E:
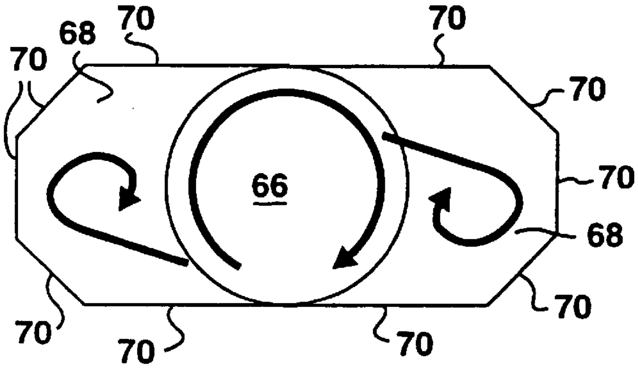
Figure 21A:
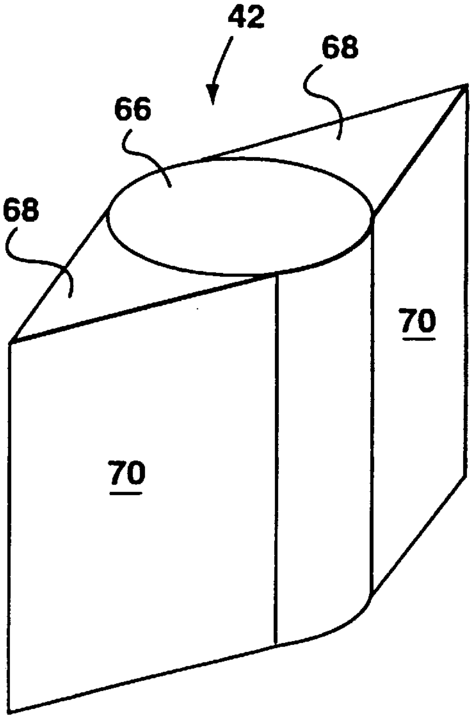
Figure 22B:
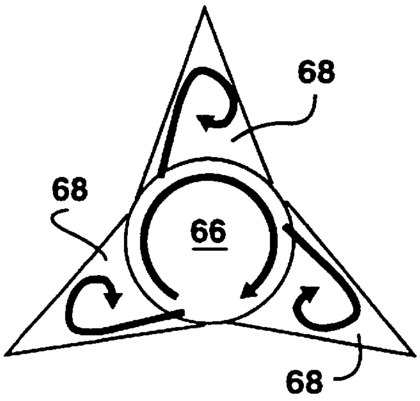
Figure 22A:
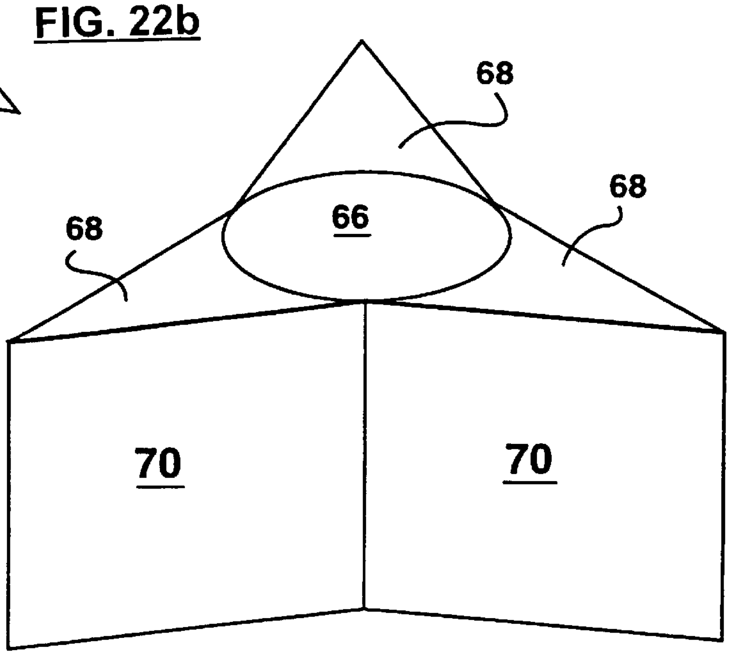
Figure 22C:
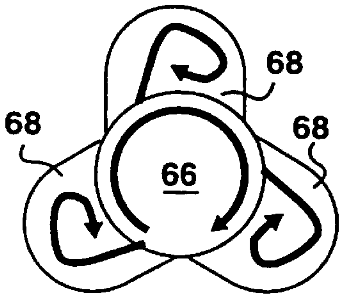
Figure 22D:
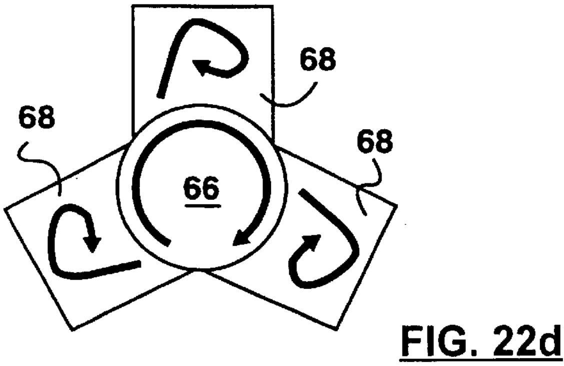
Figure 22E:
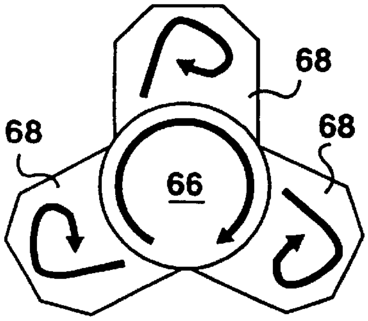
Figure 23B:
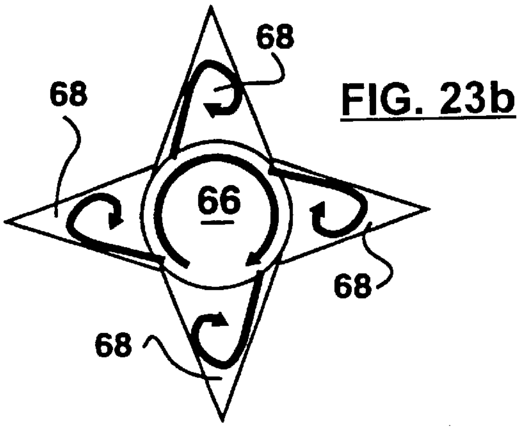
Figure 23C:
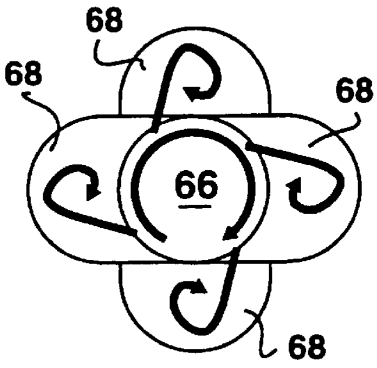
Figure 23D:
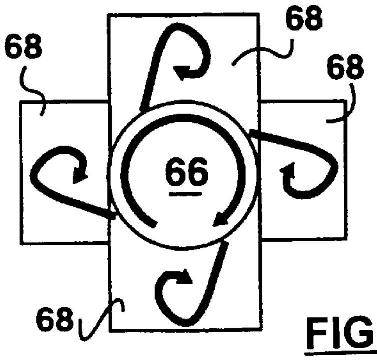
Figure 23E:
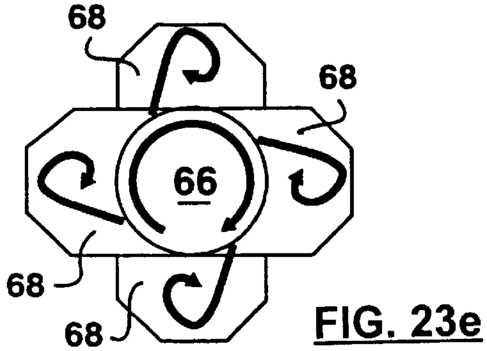
Figure 23A:
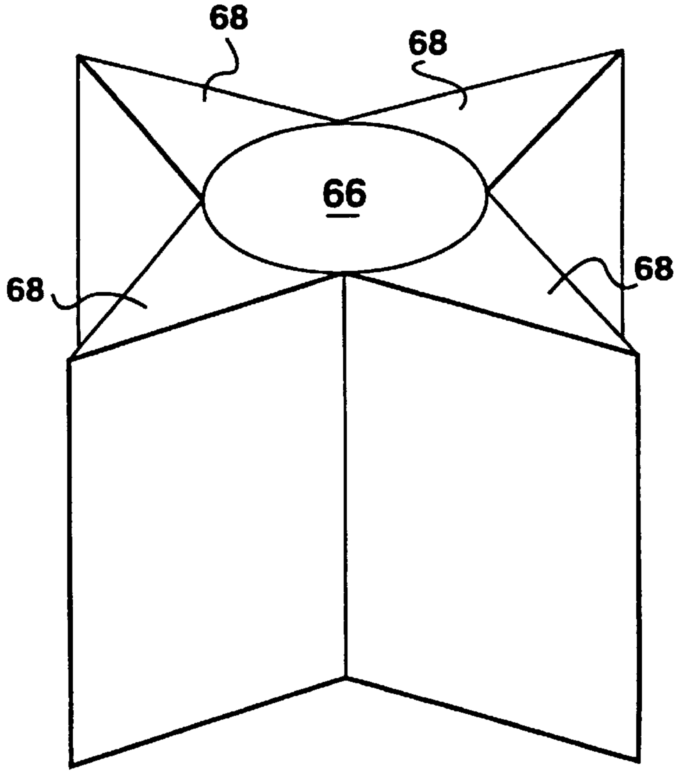
Figure 25B:
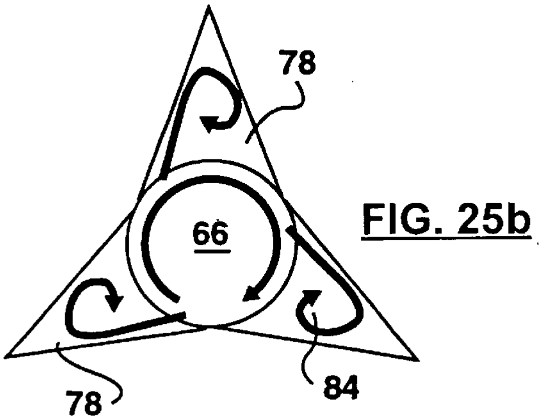
Figure 25C:
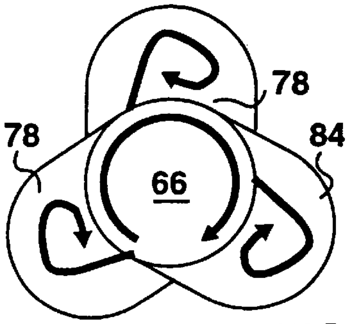
Figure 25A:
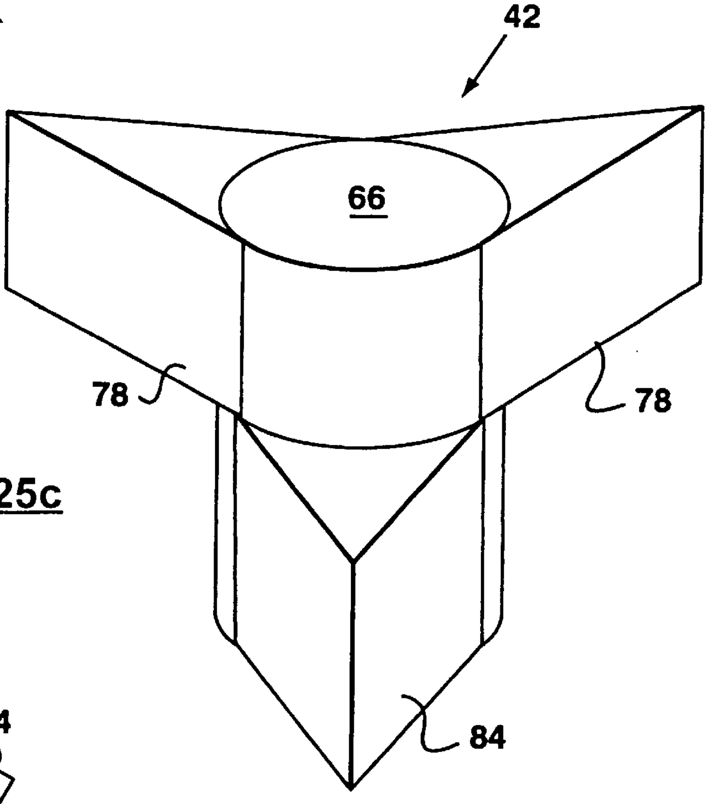
Figure 25D:
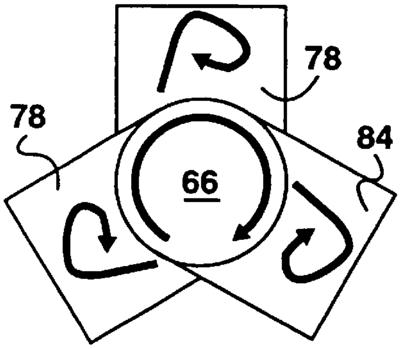
Figure 25E:
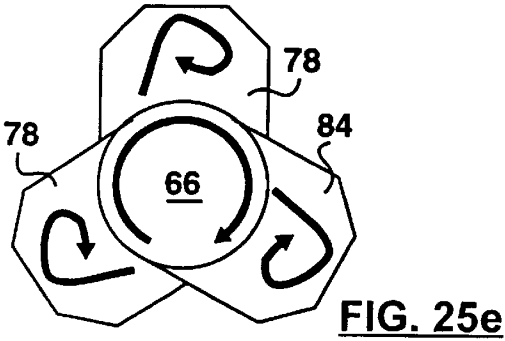
Figure 26B:
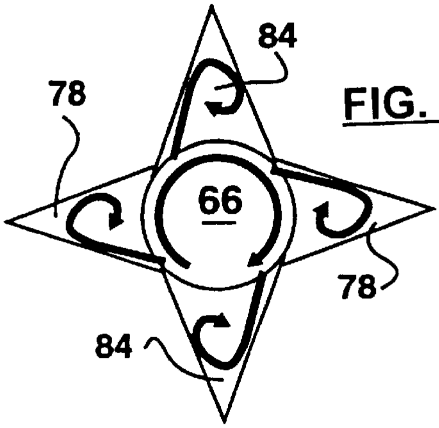
Figure 26A:
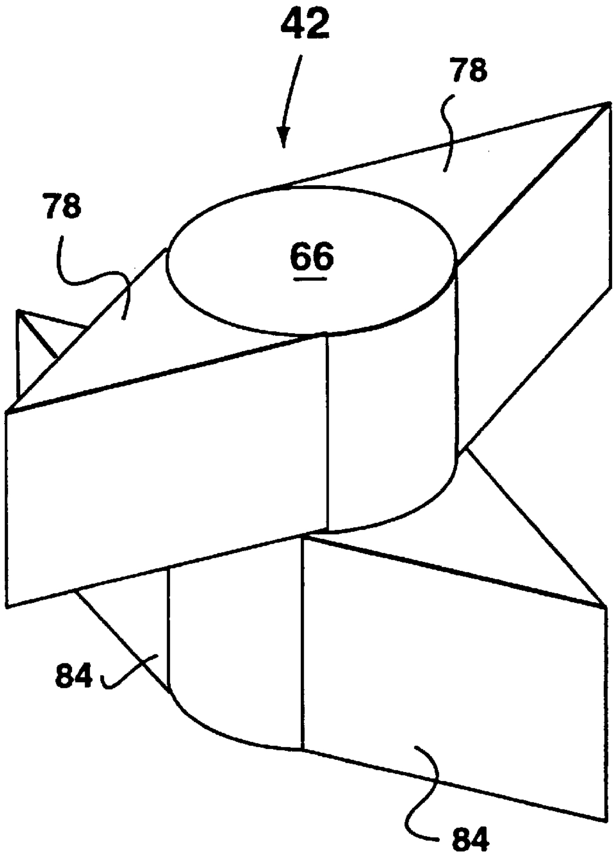
Figure 26C:
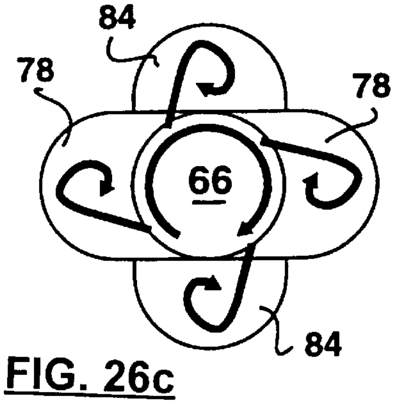
Figure 26D:
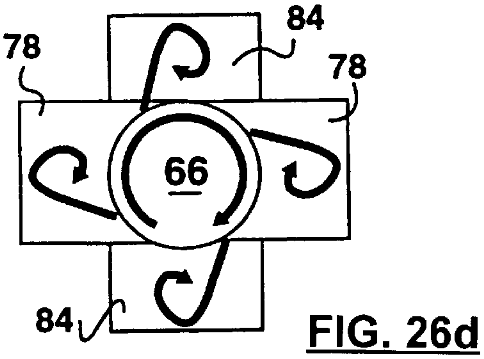
Figure 26E:
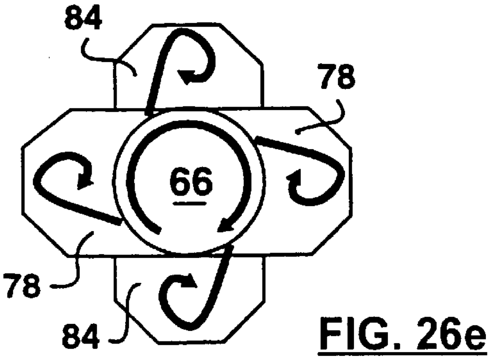
Figure 27B:
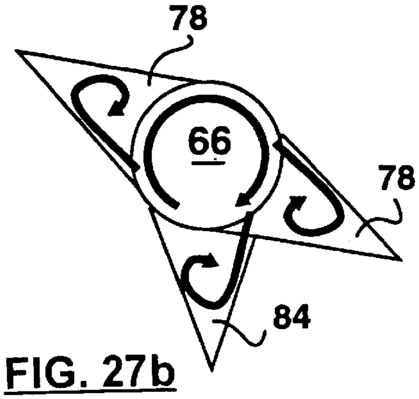
Figure 27A:
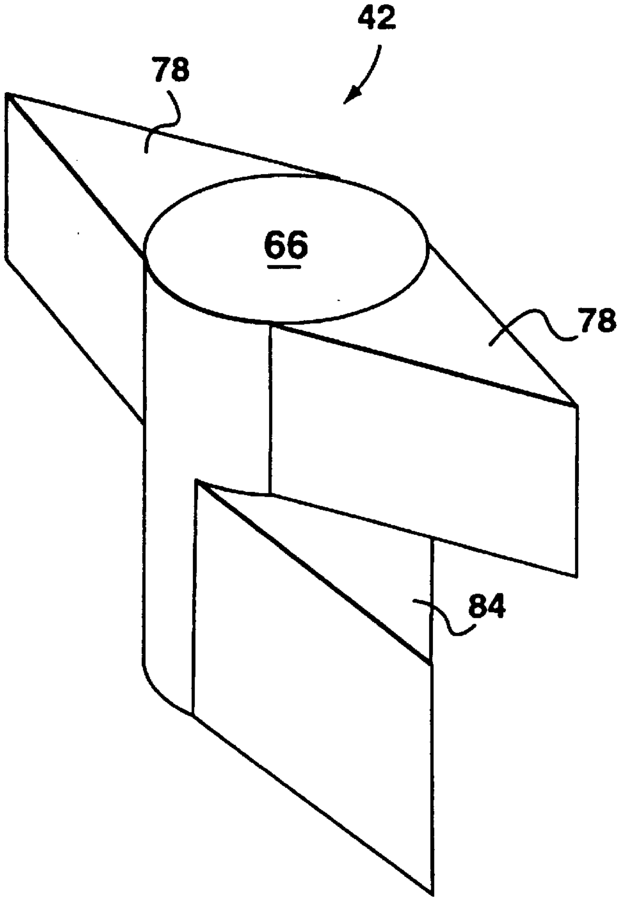
Figure 27C:
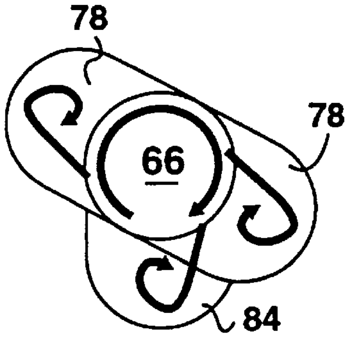
Figure 27D:
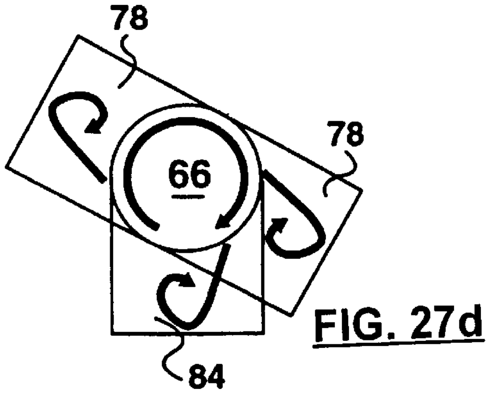
Figure 27E:
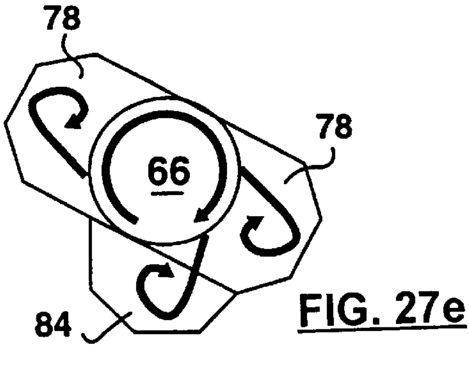
Figure 28B:
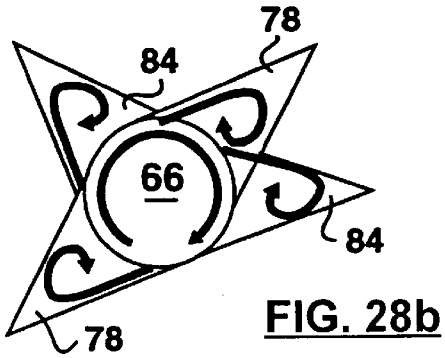
Figure 28C:
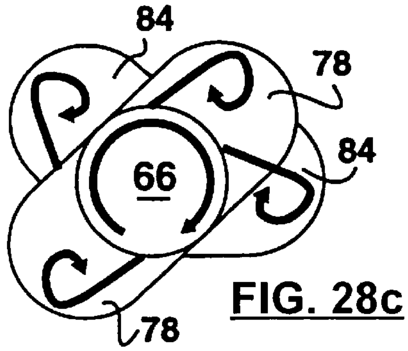
Figure 28D:
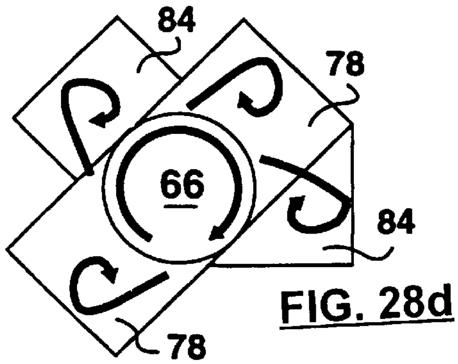
Figure 28E:
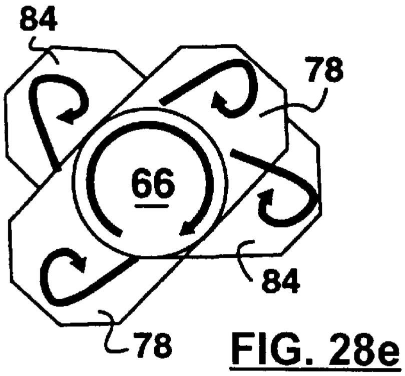
Figure 28A:
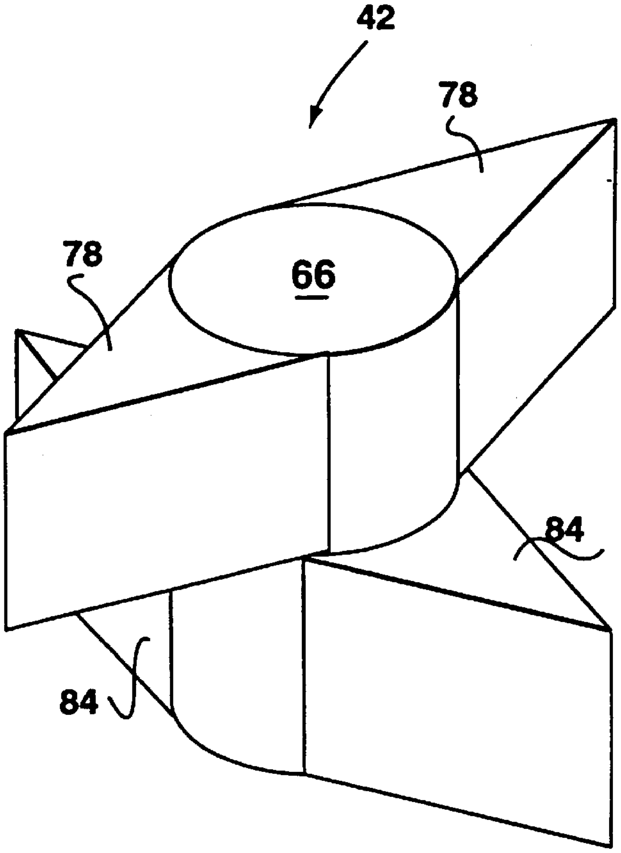
Figure 29B:
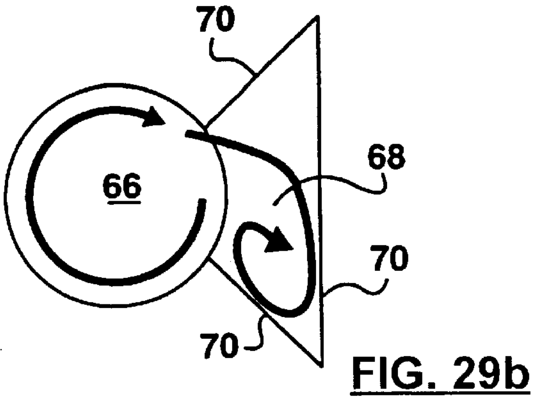
Figure 29A:
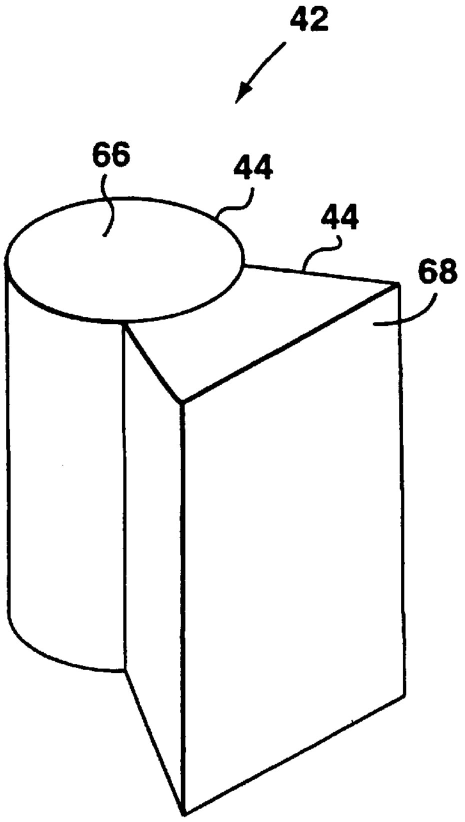
Figure 29C:
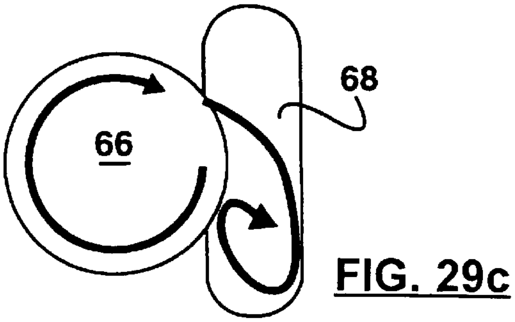
Figure 29D:
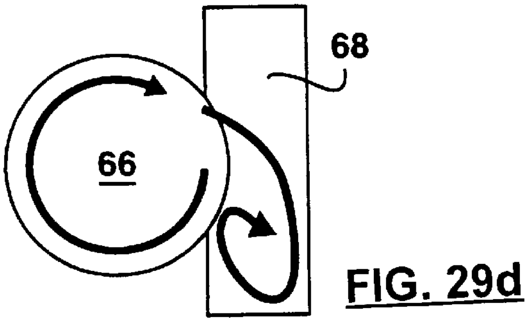
Figure 29E:
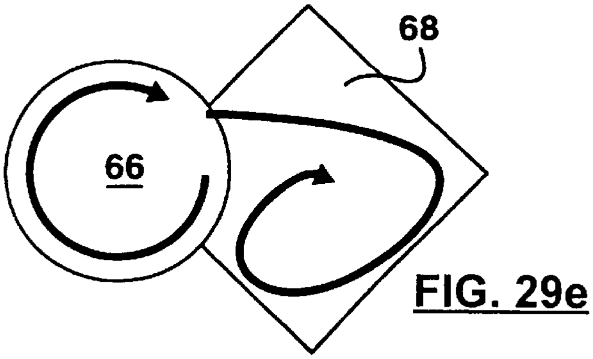
Figure 30B:
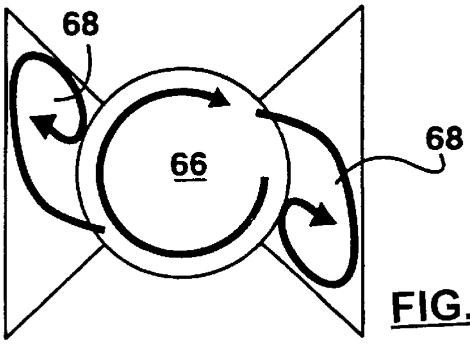
Figure 30C:
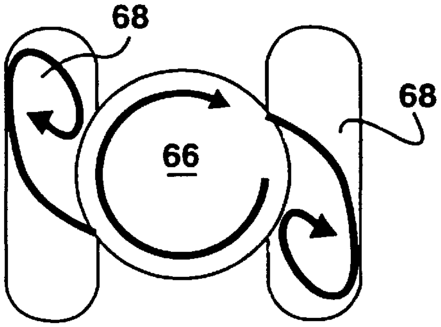
Figure 30A:
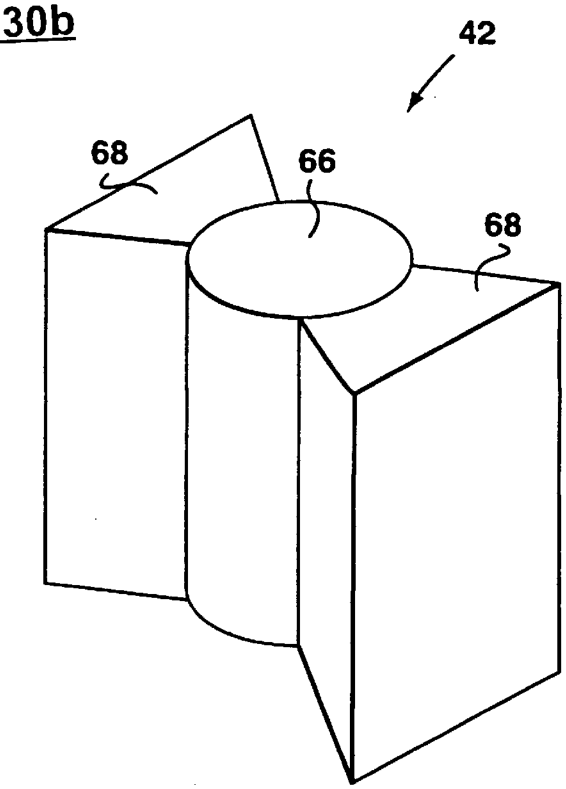
Figure 30D:
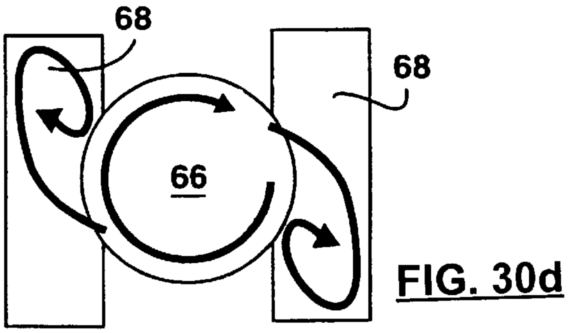
Figure 30E:
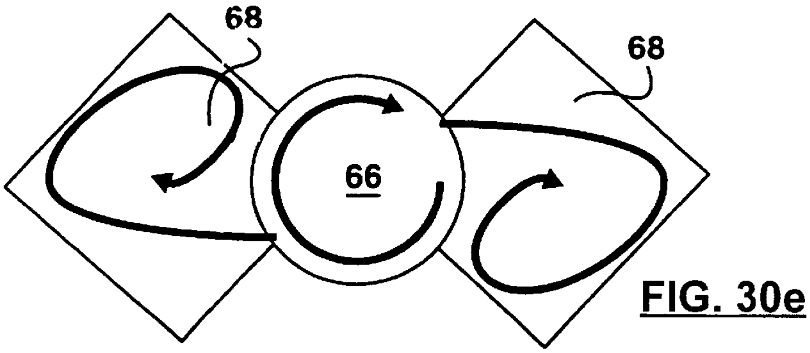
Figure 31B:
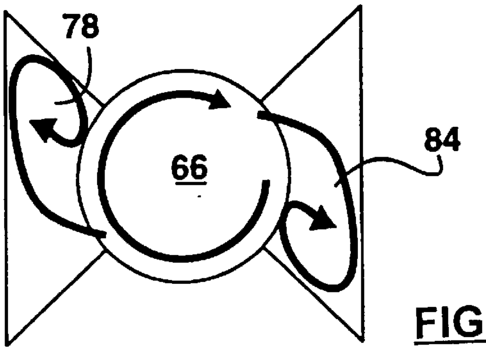
Figure 31A:
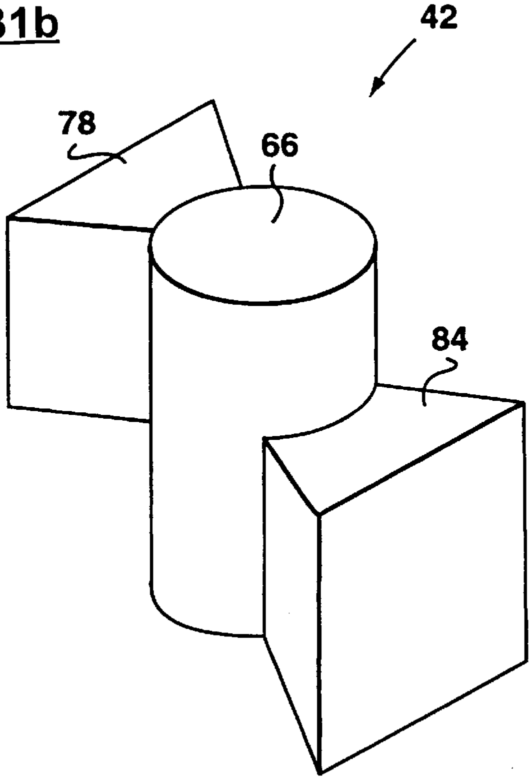
Figure 31C:
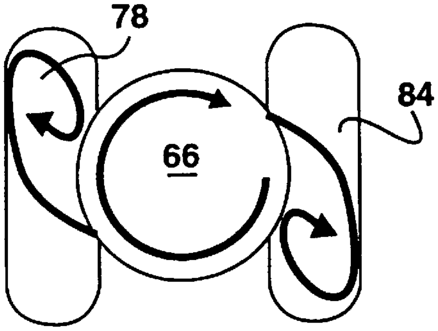
Figure 31D:
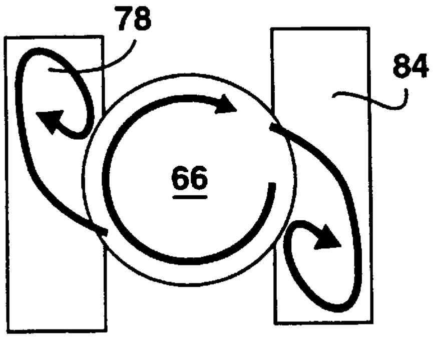
Figure 31E:
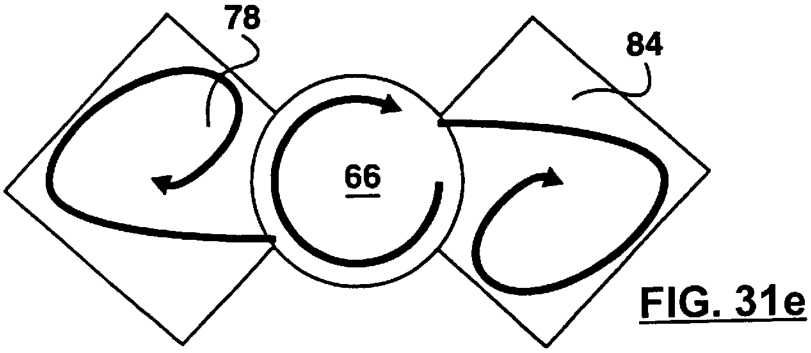
Figure 32B:
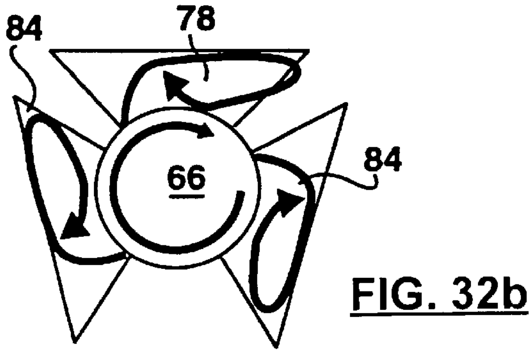
Figure 32C:
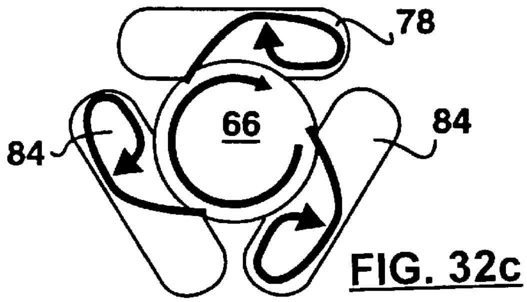
Figure 32A:
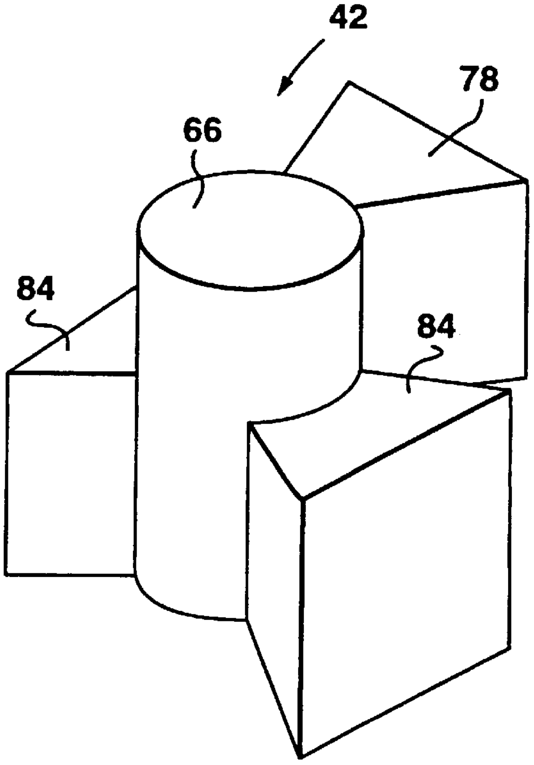
Figure 32D:
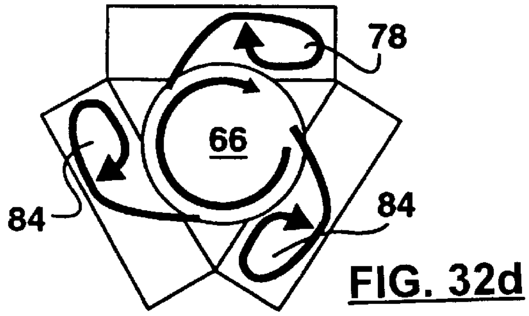
Figure 32E:
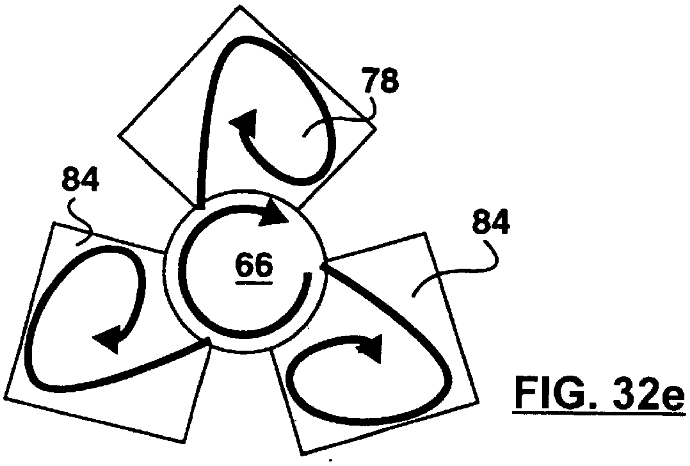
Figure 33B:
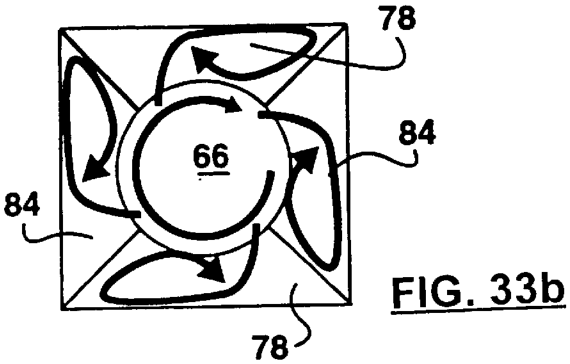
Figure 33C:
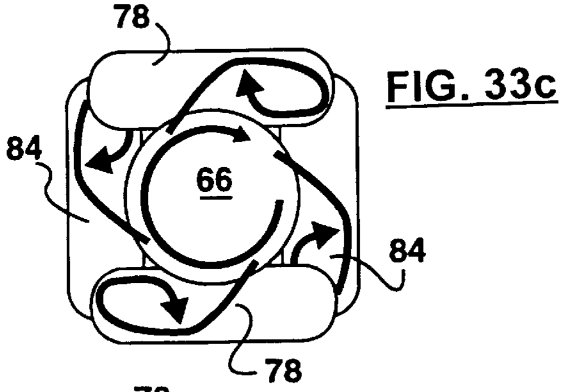
Figure 33D:
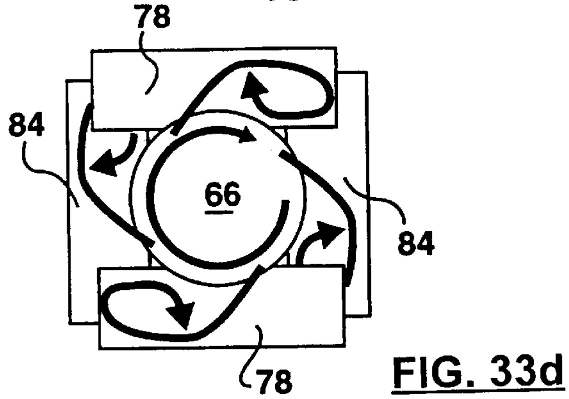
Figure 33A:
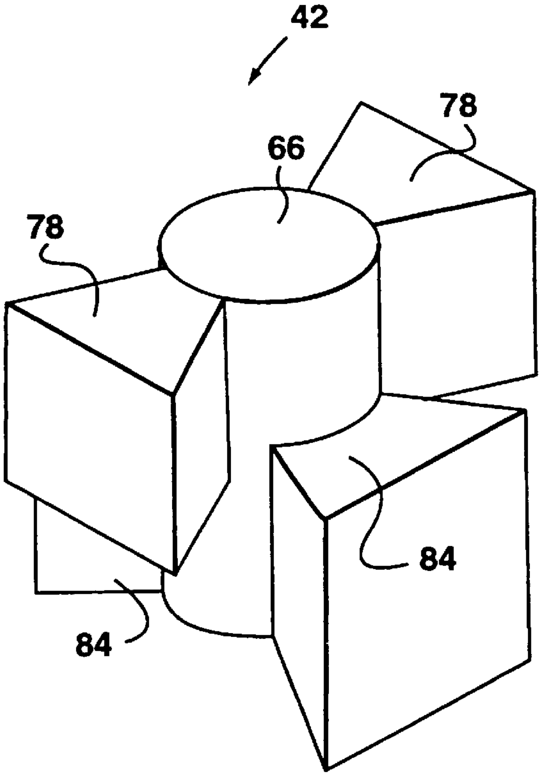
Figure 33E:
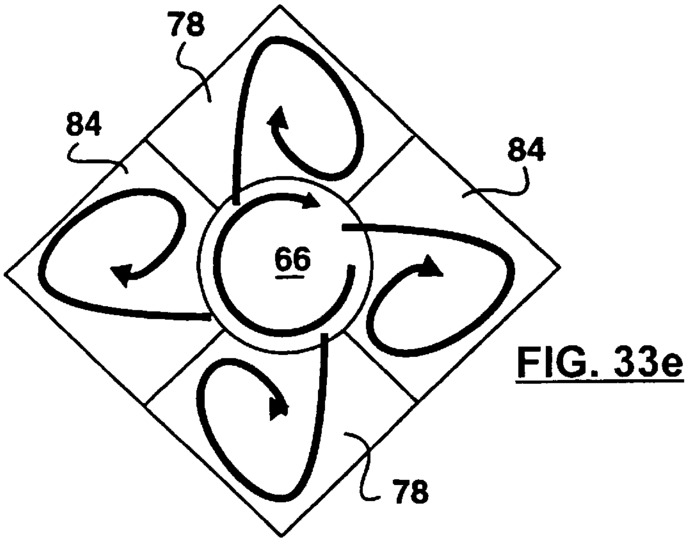
Figure 34B:
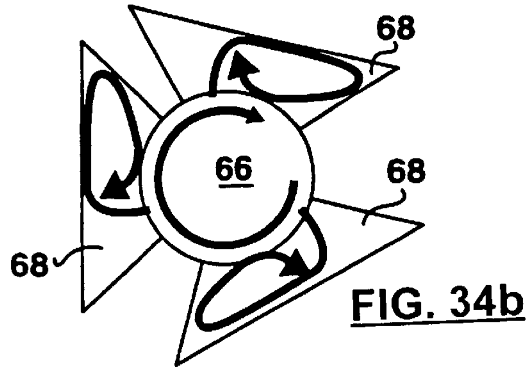
Figure 34C:
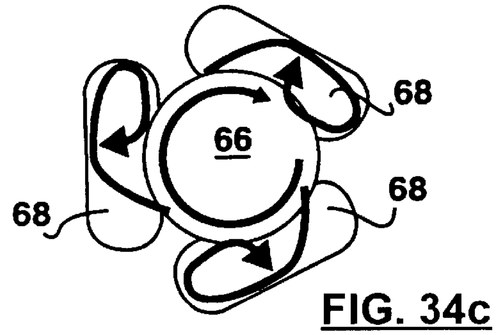
Figure 34D:
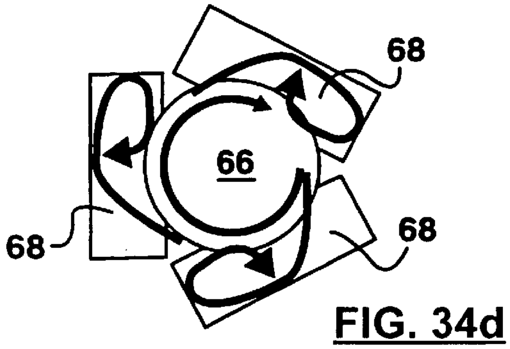
Figure 34A:
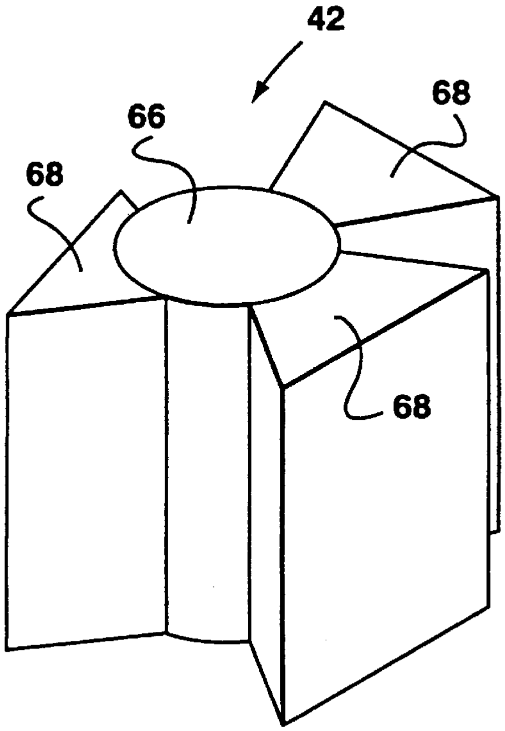
Figure 34E:
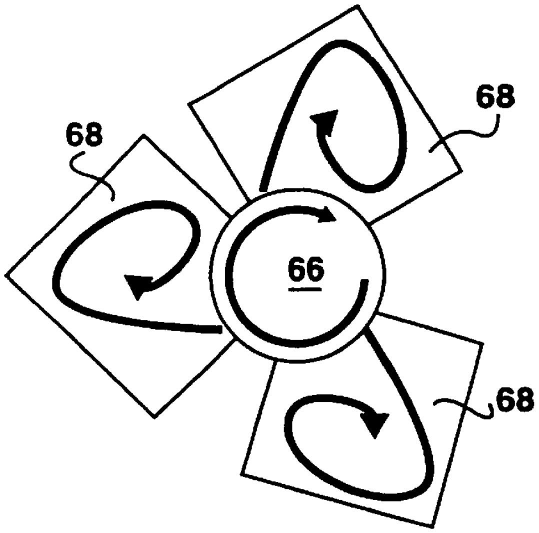
Figure 35B:
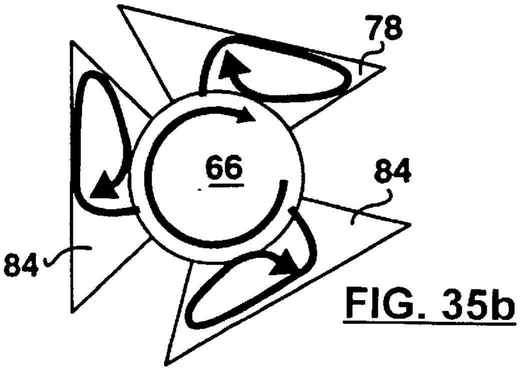
Figure 35C:
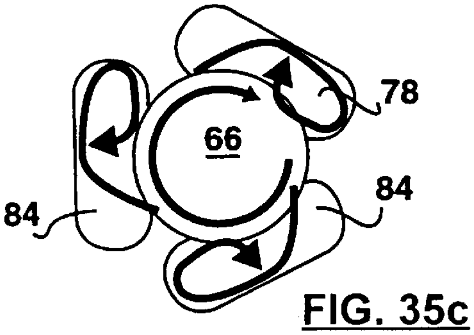
Figure 35D:
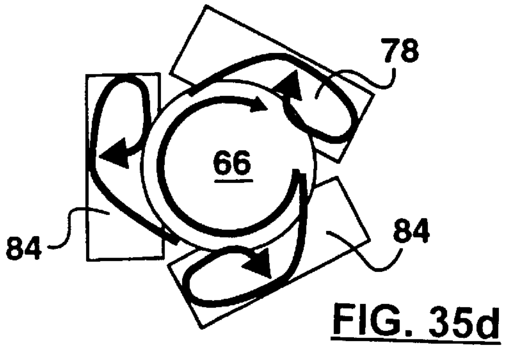
Figure 35A:
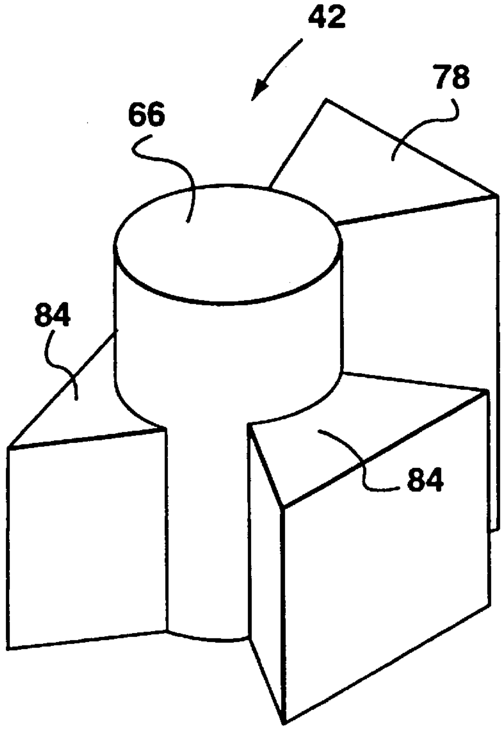
Figure 35E:
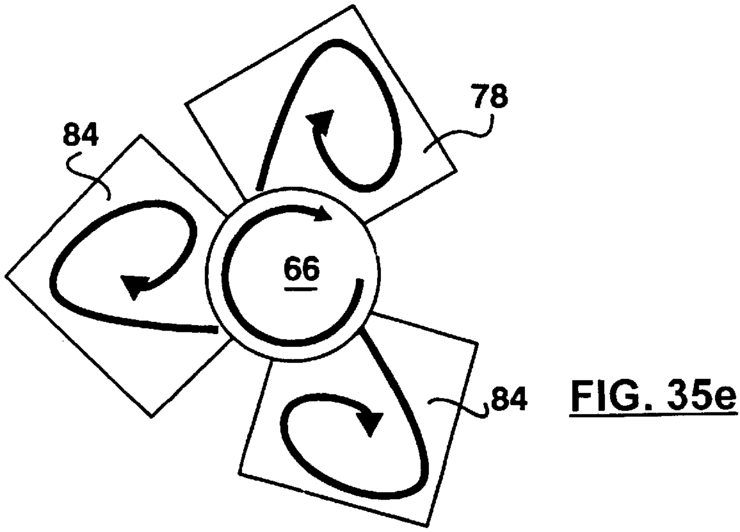
Figure 36B:
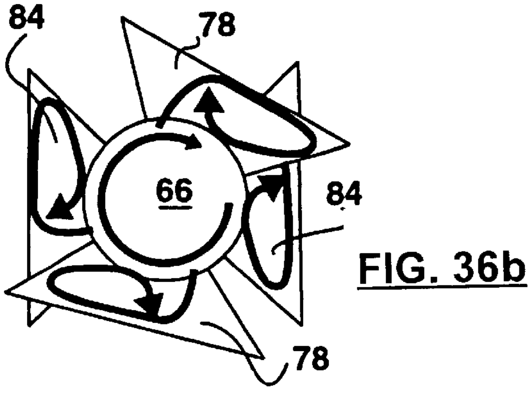
Figure 36C:
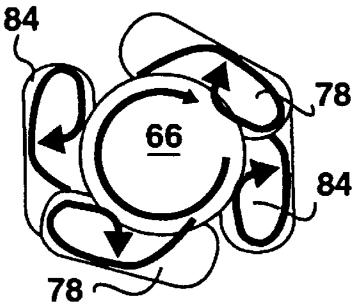
Figure 36A:
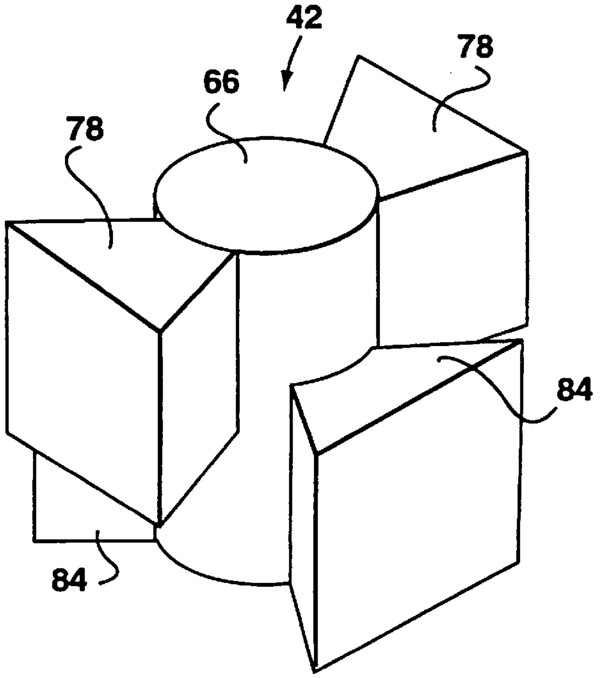
Figure 36D:
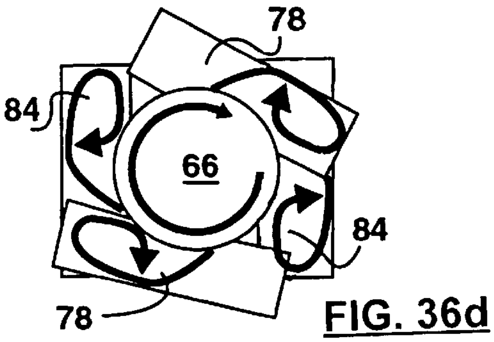
Figure 36E:
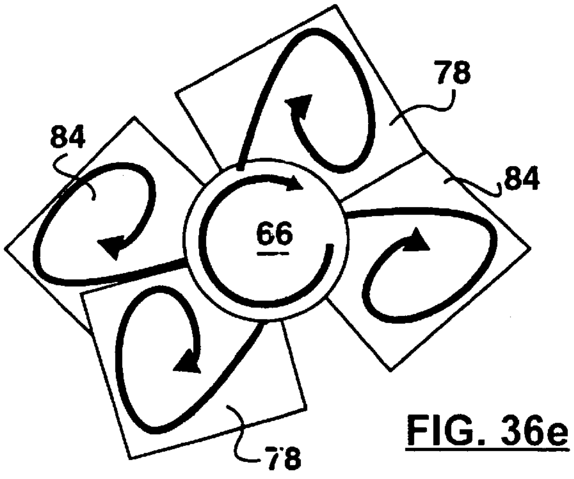

Outer portions 68 may be positioned non-symmetrically around inner portion 66. It has been found that, generally, the use of non-symmetrically positioned outer portions 68 produces a reduced pressure drop in cyclone separator as compared with symmetrically positioned outer portions 68. As shown in FIG. 16*a*–16*e*, three outer portions 68 may be provided non-symmetrically around inner portion 66. Two or more of the outer portions may be positioned side by side so as to define effectively a continuous space as shown in FIG. 16*a*. Alternately, as shown in FIGS. 16*c*–16*e*, each outer portion 68 may be spaced apart around the circumference of inner portion 66. FIGS. 17*a*–17*e* showing an alternate variation in which four outer portions 68 are provided around inner portion 66.

As discussed above with respect to FIGS. 13*a*–13*e*, 14*a*–14*e* and 15*a*–15*e*, upper outer portions 78 and lower outer portions 84 may be non-symmetrically disposed around inner portion 66 at varying heights as exemplified in FIGS. 18*a*–18*e* and FIGS. 19*a*–19*e*.

In another embodiment, the cross-sectional area of inner portions 66 may be the same as the cross-sectional area of outer portion 68. Such a configuration is advantageous when fluid 48 contains two sets of particles whose density is their primary distinguishing characteristic and it is desired to separate the two particle sets from fluid 48. Outer portion 68 may be configured in any manner discussed above with respect to FIGS. 8*a*–8*e* through 19*a*–19*e*. Some of these configurations are exemplified in FIGS. 20*a*–20*e* through 28*a*–28*e*. In particular, FIGS. 20*a*–20*e* show possible configurations for a single outer portion 68 which has the same length as inner portion 66. FIGS. 21*a*–21*e*, 22*a*–22*e* and 23*a*–23*e* show possible configurations for a plurality of outer portions 68 which are symmetrically positioned around inner portion 66 wherein, in total, the cross sectional area of all outer portions 68 is the same as the cross-sectional area of inner portion 66. As will be appreciated from, for example, FIGS. 21*c*–21*e*, that outer portions 68 may fully surround inner portion 66 such that walls 70 of outer portions 68 defines wall 44 of cavity 42.

As shown in FIGS. 24*a*–24*e*, 25*a*–25*e* and 26*a*–26*e*, a plurality of outer portions which have, in total, the same cross sectional area as inner portion 66 may be symmetrically positioned around inner portion 66 and at staggered heights along the longitudinal length of inner portion 66. Further, as shown in FIGS. 27*a*–27*e* and 28*a*–28*e*, such staggered outer portions may be non-symmetrically positioned around inner portion 66.

In another embodiment, the cross sectional area of the outer portion may be larger than the cross sectional area of inner portion 66. This configuration is advantageous when fluid 48 contains a large particle load to be separated in cyclone separator 30. According to this embodiment, there may be one or a plurality of outer portions 68 and the outer portions may be configured in the same manner as discussed above with respect to FIGS. 8*a*–8*e* through 19*a*–19*e*. Examples of such configurations are shown in FIGS. 29*a*–29*e* through 36*a*–36*e*.

Figure 37B:
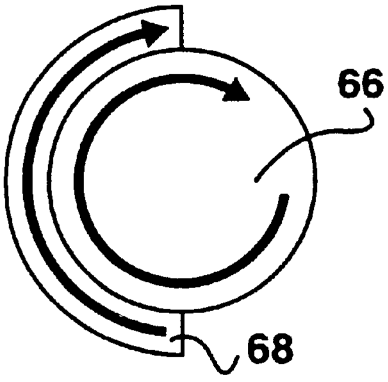
Figure 37A:
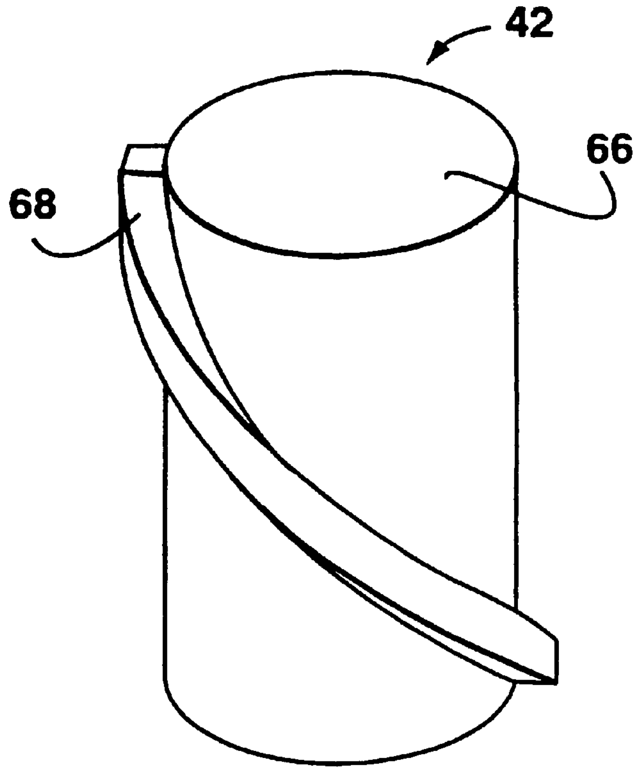
Figure 38B:
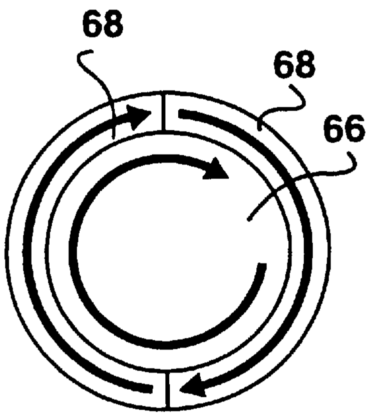
Figure 38C:
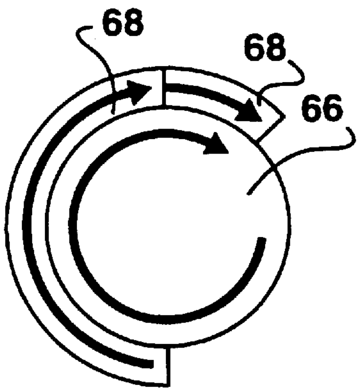
Figure 38A:
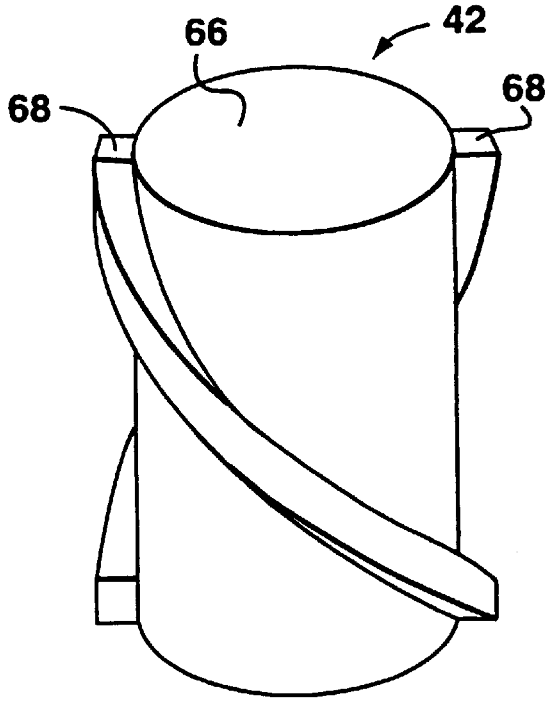
Figure 39B:
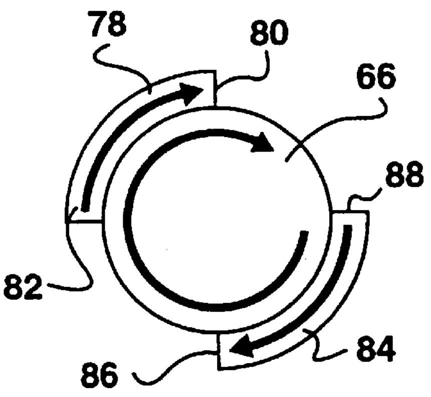
Figure 39A:
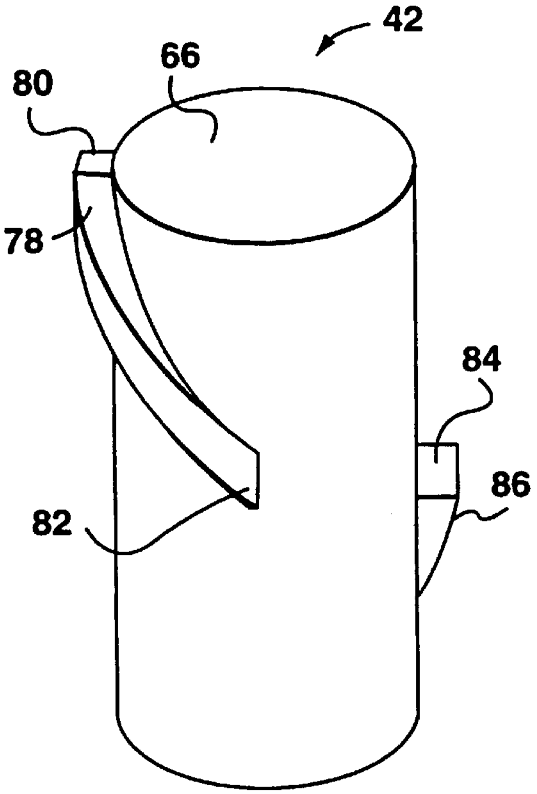

As shown in FIGS. 37*a*–37*b*, 38*a*–38*c* and 39*a*–39*b*, the outer portion may be in the form of one or more helix. As shown in FIGS. 37*a* and 37*b*, outer portion 68 comprises a single helix which extends downwardly around inner portion 66. As shown in FIGS. 38*a* and 38*b*, two helix may be provided in a symmetrical pattern around inner portion 66. Alternately, as shown in FIG. 38*c*, the two helical outer portions 68 may be non-symmetrically positioned around inner portion 66. Further, the helical outer portions may be at staggered heights around inner portion 66 as shown in FIGS. 39*a* and 39*b*.

It is to be appreciated that, if there are a plurality of outer portions, that there are other patterns which may be used which are not specifically shown in the attached drawings.

Figure 8A:
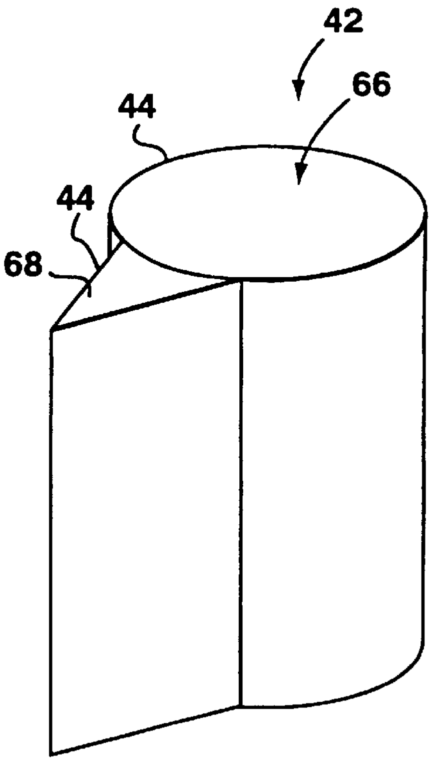
Figure 9B:
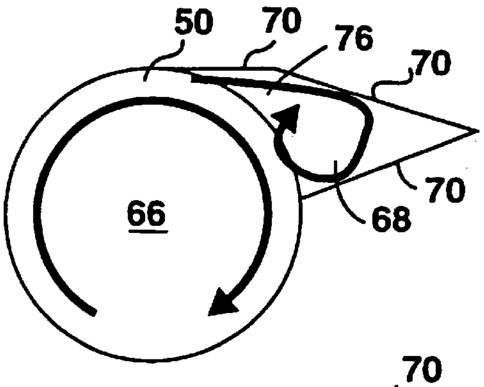
Figure 9A:
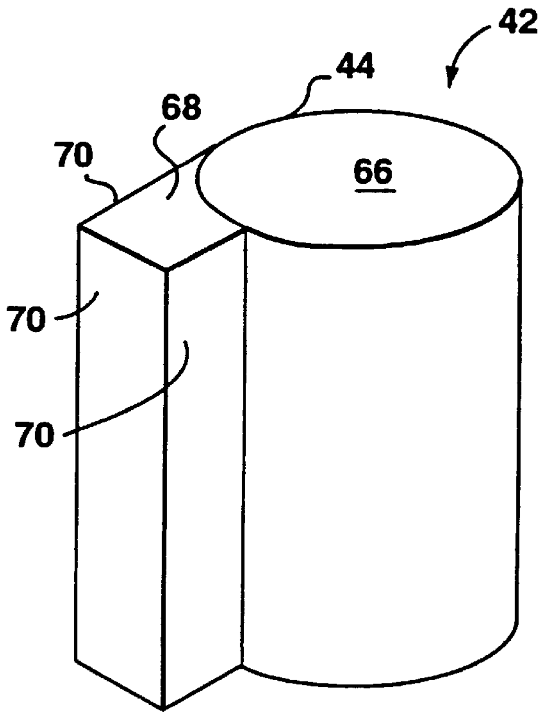
Figure 9C:
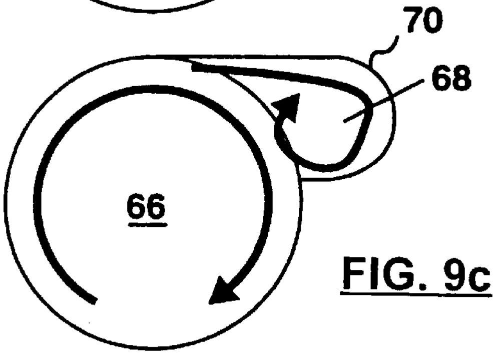
Figure 9D:
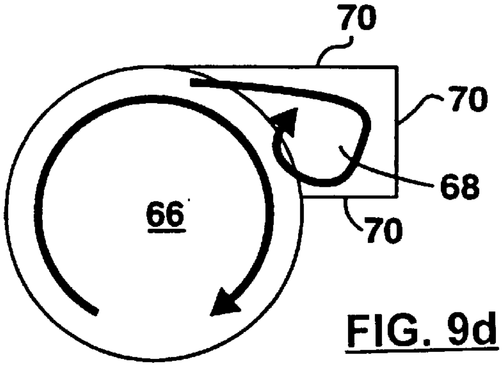
Figure 9E:
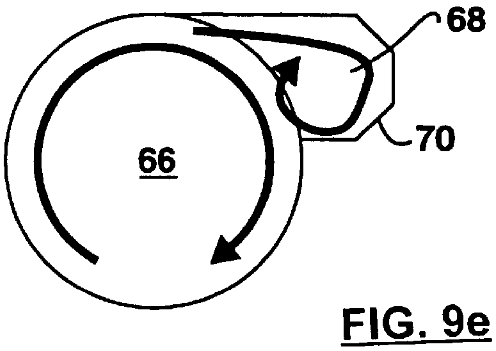
Figure 10B:
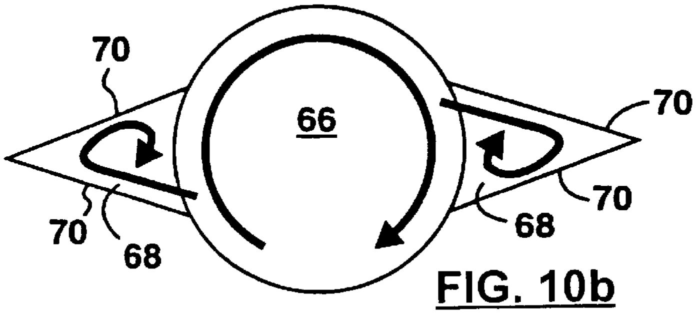
Figure 10C:
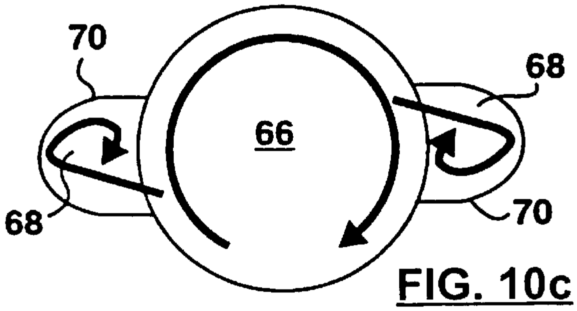
Figure 10D:
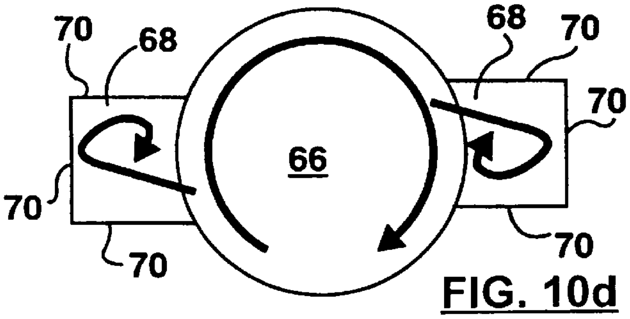
Figure 10E:
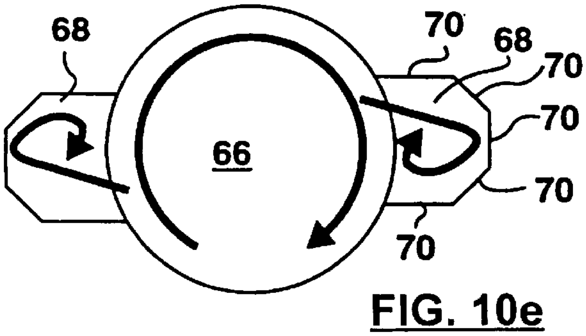
Figure 10A:
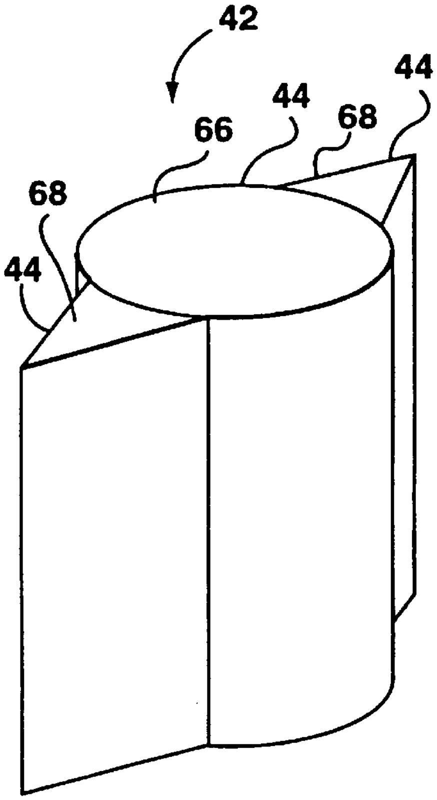
Figure 11B:
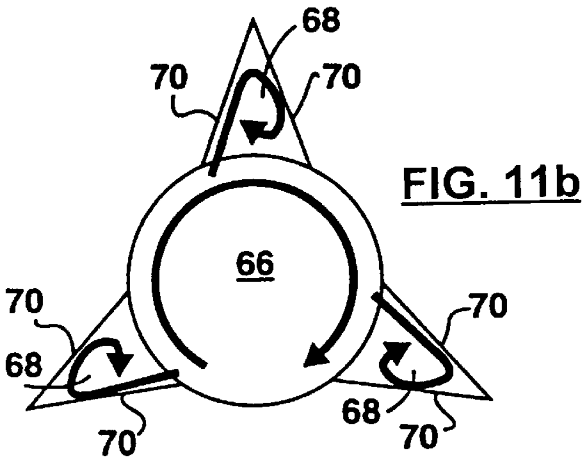
Figure 11A:
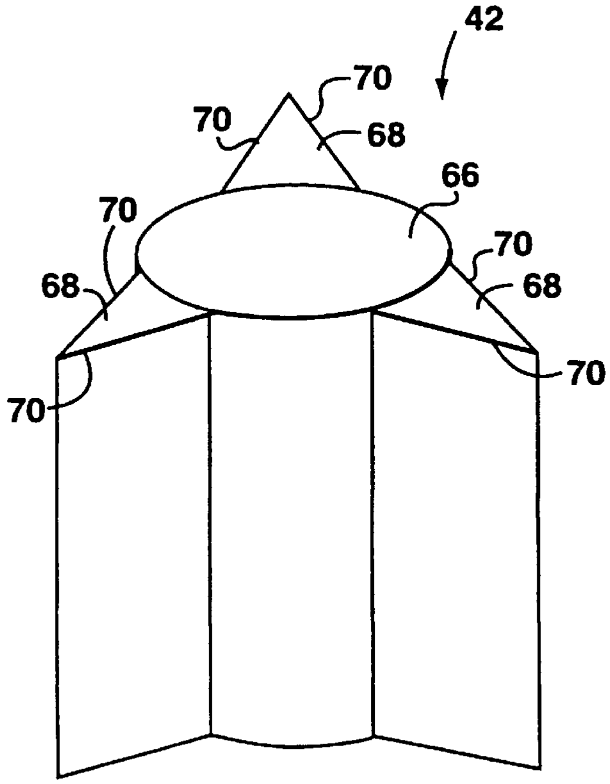
Figure 11C:
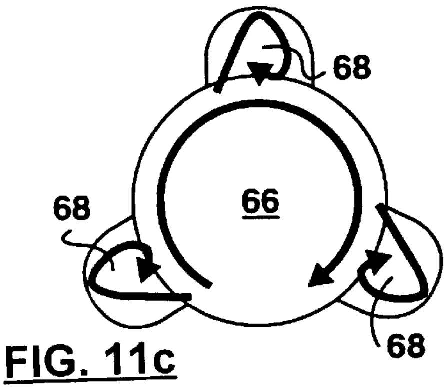
Figure 11D:
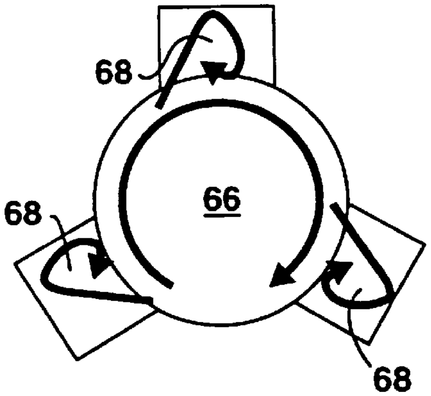
Figure 11E:
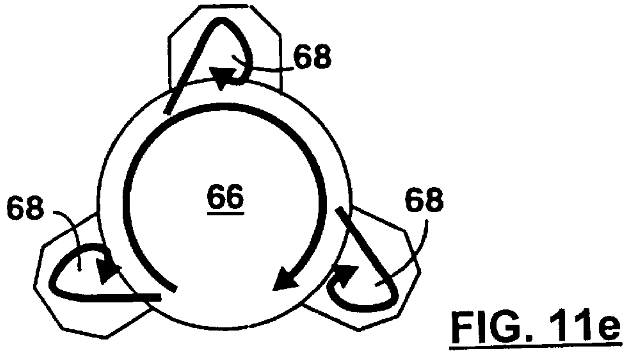
Figure 12B:
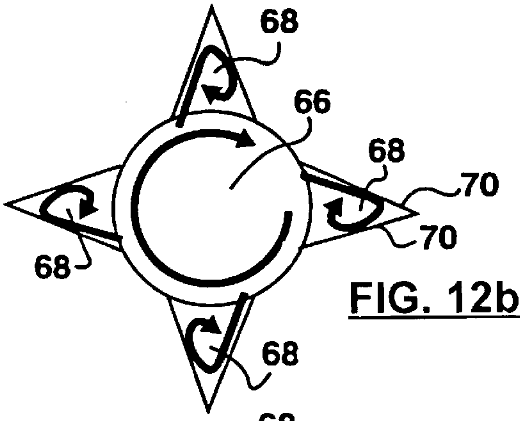
Figure 12A:
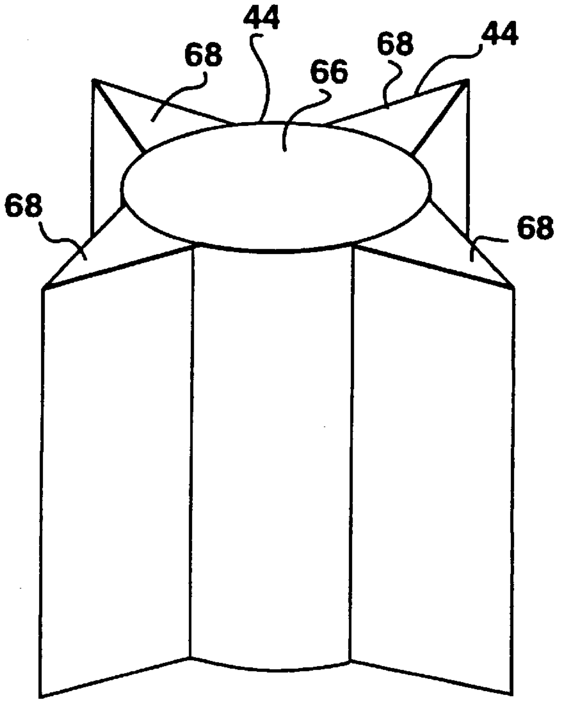
Figure 12C:
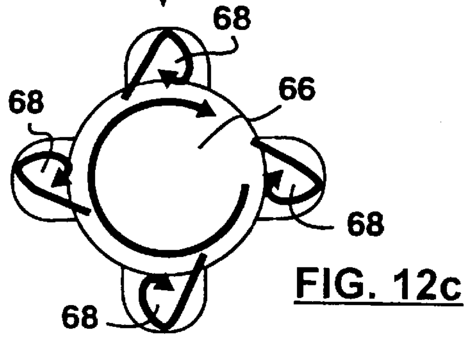
Figure 12D:
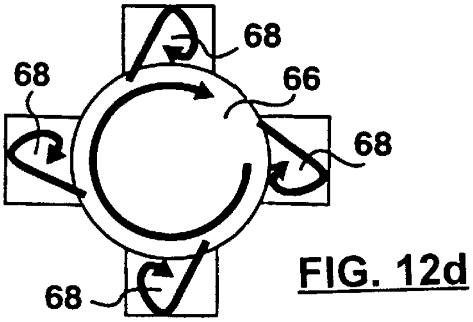
Figure 12E:
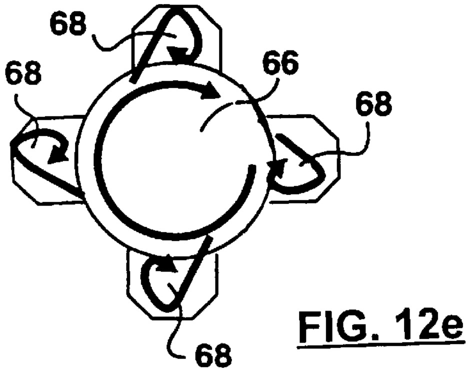

It is to be appreciated that the description of cyclone separator 30 has been in particular reference to the shape of cavity 42 when taken in transverse section. As shown in, for example, FIG. 8*a*, the transverse section of cavity 42 may remain constant throughout its entire length F. Accordingly, FIG. 8*a* shows a cyclone separator having a cavity which is substantially cylindrical with the exception of outer portion 68. Alternately, the transverse cross sectional area of cavity 42 may vary along the longitudinal length F of cavity 42. For example, the transverse cross-sectional area of one or both of inner portion 66 and outer portion 68 may become smaller or larger or alternate therebetween along the longitudinal length F of cavity 42. Thus, inner portion 66 may be in the shape of a frusto-conical cyclone as is known in the prior art. Alternately, inner portion 66 may be configured as is taught in co-pending application No. 09/136,366 entitled CYCLONE SEPARATOR HAVING A VARIABLE LONGITUDINAL PROFILE filed concurrently herewith, the entire teaching of which is incorporated herein by reference.

It will also be appreciated that, depending upon the degree of material separation which is required and the composition of the material in the fluid to be treated that a plurality of cyclone separators may be connected in series. The plurality of separators may be positioned side by side or nested (one inside the other).

We claim:

1. A cyclone separator for separating a material from a fluid comprising a longitudinally extending body having a wall extending around an internal cavity, the wall having an inner surface, the internal cavity having, in transverse section, an inner portion in which the fluid rotates when the separator is in use to define a first cyclone and at least one outer portion positioned external to the inner portion and contiguous therewith, the outer portion of the cavity extending outwardly from the inner portion of the cavity each outer portion configured to produce at least one second cyclone exterior to the first cyclone and a low velocity zone in which material separated from the fluid travels longitudinally through the cyclone separator.

2. The separator as claimed in claim 1 wherein the inner surface of the wall is configured to impart changes in the rate of acceleration to the portion of the fluid as it rotates in the plane defined by the transverse section.

3. The separator as claimed in claim 1 wherein the wall is configured to continuously impart changes in the rate of acceleration to the fluid as it rotates in the plane defined by the transverse section.

4. The separator as claimed in claim 1 wherein the wall interacts with the portion of the fluid to impart to the portion of the fluid a different speed, a different direction of travel or a different velocity compared to that of the fluid rotating in the inner portion of the cavity.

5. The separator as claimed in claim 1 wherein the cavity has a plurality of outer portions.

6. The separator as claimed in claim 5 wherein the inner surface of the wall around each of the outer portions is configured to interact with the portion of the fluid to create a low velocity zone in each of the outer portions of the cavity, and each of the low velocity zones extends longitudinally in the same direction as the separator.

7. The separator as claimed in claim 6 wherein each of the outer portions has an upstream end and a downstream end, the upstream end of at least one of the portions longitudinally positioned at a portion of the inner surface different to the position of the upstream end of another outer portion.

8. The separator as claimed in claim 7 wherein the upstream end of at least one of the outer portions is longitudinally positioned at a portion of the inner surface adjacent the downstream end of another outer portion.

9. The separator as claimed in claim 8 wherein the local pressure differential is produced by shearing fluid over a discontinuity in the wall.

10. The separator as claimed in claim 5 wherein the outer portions are positioned symmetrically around the inner portion.

11. The separator as claimed in claim 5 wherein the outer portions are positioned non-symmetrically around the inner portion.

12. The separator as claimed in claim 5 wherein the outer portions extend contiguously around the inner portion.

13. The separator as claimed in claim 1 wherein the inner surface of the wall is configured to produce a boundary layer and material separated from the fluid by the second cyclone travels with the boundary layer longitudinally through the cyclone separator without substantial re-entrainment.

14. The separator as claimed in claim 13 wherein the boundary layer travels longitudinally in the same direction as the separator.

15. The separator as claimed in claim 1 wherein the outer portion has a receiving portion for receiving the material which is separated from the fluid.

16. The separator as claimed in claim 15 wherein the separator is vertically disposed and the receiving portion is positioned towards the lower end of the separator and comprises a collecting chamber in which the separated material is collected.

17. The separator as claimed in claim 13 wherein the outer portion has a receiving portion for receiving the material which is separated from the fluid and the separator has an upstream end and a downstream end and the receiving portion is positioned towards the downstream end of the separator and is in flow communication with a chamber downstream thereof.

18. The separator as claimed in claim 1 wherein the wall in the region of each of the outer portions is configured to produce a local pressure differential within the outer portion.

19. The separator as claimed in claim 18 wherein the wall is configured to produce a boundary layer flow and the local pressure differential is produced by configuring the wall to increase the boundary layer flow to a Reynolds number greater than 3000.

20. The separator as claimed in claim 1 constructed and arranged so that the fluid which is introduced into the cyclone comprises a gas which has a material selected from the group consisting of solid particles, a liquid, a second gas and a mixture thereof contained therein and a portion of the material is removed from the gas as the gas passes through the separator.

21. The separator as claimed in claim 1 constructed and arranged so that the fluid which is introduced into the cyclone comprises a liquid which has a material selected from the group consisting of solid particles, a second liquid, a gas and a mixture thereof contained therein and a portion of the material is removed from the liquid as the liquid passes through the separator.

22. The separator as claimed in claim 1 constructed and arranged so that the fluid which is introduced into the cyclone comprises at least two fluids having different densities and the inner wall includes at least a portion which is configured to decrease the rate of acceleration of the fluid as it passes through that portion of the separator.

23. The separator as claimed in claim 1 wherein the transverse cross-sectional area of the outer portion is less than the transverse cross sectional area of the inner portion.

24. The separator as claimed in claim 1 wherein the transverse cross-sectional area of the outer portion is the same as the transverse cross sectional area of the inner portion.

25. The separator as claimed in claim 1 wherein the transverse cross-sectional area of the outer portion is greater than the transverse cross sectional area of the inner portion.

26. The separator as claimed in claim 1 wherein the outer portion comprises a helix.

27. A cyclone separator for separating a material from a fluid comprising a longitudinally extending body having a wall which, in transverse section, extends in a closed path, the wall having a non-baffled inner surface which defines an internal cavity, the internal cavity having an inner portion in which the fluid rotates when the separator is in use to define a first cyclone, and at least one outer portion positioned external to the inner portion and contiguous therewith defining a zone in which the wall is configured to produce at least one second cyclone external to the first cyclone and to hinder re-entrainment of material separated from the fluid by the at least one second cyclone.

28. The separator as claimed in claim 27 wherein the wall is configured to impart changes in the rate of acceleration to the portion of the fluid as it rotates in the plane defined by the transverse section.

29. The separator as claimed in claim 27 wherein the wall is configured to direct the portion of the fluid into the outer portion of the cavity.

30. The separator as claimed in claim 27 wherein the wall interacts with the portion of the fluid to impart to the portion of the fluid a different speed, a different direction of travel or a different velocity compared to that of the fluid rotating in the inner portion of the cavity.

31. The separator as claimed in claim 27 wherein the cavity has a plurality of outer portions.

32. The separator as claimed in claim 27 wherein the inner surface of the wall around each outer portion is configured to interact with the portion of the fluid to create a low velocity zone in each outer portion of the cavity, and each low velocity zone extends longitudinally in the same direction as the separator.

33. The separator as claimed in claim 32 wherein each of the outer portions has an upstream end and a downstream end, the upstream end of at least one of the portions longitudinally positioned at a portion of the inner surface different to the position of the upstream end of another outer portion.

34. The separator as claimed in claim 33 wherein the upstream end of at least one of the outer portions is longitudinally positioned at a portion of the inner surface adjacent the downstream end of another outer portion.

35. The separator as claimed in claim 31 the wall is configured to produce a boundary layer flow and the local pressure differential is produced by configuring the wall to increase the boundary layer flow to a Reynolds number greater than 3000.

36. The separator as claimed in claim 31 wherein the outer portions extend contiguously around the inner portion.

37. The separator as claimed in claim 27 wherein the inner surface of the wall is configured to interact with the portion of the fluid to create a dead air space in the outer portion of the cavity.

38. The separator as claimed in claim 37 wherein the dead air space extends longitudinally in the same direction as the separator.

39. The separator as claimed in clam 37 herein the outer portions are positioned non-symmetrically around the inner portion.

40. The separator as claimed in claim 27 wherein the outer portion has a receiving portion for receiving the material which is separated from the fluid.

41. The separator as claimed in claim 40 wherein the separator is vertically disposed and the receiving portion is positioned towards the lower end of the separator and comprises a collecting chamber in which the separated material is collected.

42. The separator as claimed in claim 40 wherein the separator has an upstream end and a downstream end and the receiving portion is positioned towards the downstream end of the separator and is in flow communication with a chamber downstream thereof.

43. The separator as claimed in claim 27 wherein the wall in the region of each of the outer portions is configured to produce a local pressure differential within the outer portion.

44. The separator as claimed in claim 43 wherein the local pressure differential is produced by shearing fluid over a discontinuity in the wall.

45. The separator as claimed in claim 27 herein the transverse cross-sectional area of the outer portion is less than the transverse cross sectional area of the inner portion.

46. The separator as claimed in claim 27 wherein the transverse cross-sectional area of the outer portion is the same as the transverse cross sectional area of the inner portion.

47. The separator as claimed in claim 27 wherein the transverse cross-sectional area of the outer portion is greater than the transverse cross sectional area of the inner portion.

48. The separator as claimed in claim 27 wherein the outer portion comprises a helix.

49. A cyclone separator for separating a material from a fluid comprising a longitudinally extending separator having a wall, the wall having an inner surface and defining an internal cavity within which the fluid rotates when the separator is in use to define a first cyclone, and at least one outer portion and the at least one outer portion is configured to promote the formation of a second cyclone exterior to the first cyclone and to hinder re-entrainment of material separated from the fluid.

50. The separator as claimed in claim 49 wherein the longitudinally extending body has a longitudinal axis and at least a portion of the longitudinal extent of the inner wall of the separator is defined by a curve swept 360 degrees around the axis along the continuous non-circular convex closed path.

51. The separator as claimed in claim 49 wherein the at least one outer portion defines a low velocity zone in which a portion of the material settles out from the fluid and the cyclone separator further comprises a receiving portion for receiving the material which is separated from the fluid in the portion.

52. The separator as claimed in claim 51 wherein the low velocity zone extends longitudinally in the same direction as the separator.

53. The separator as claimed in claim 49 wherein the cavity has a plurality of outer portions.

54. The separator as claimed in claim 49 wherein the inner surface of the wall around each outer portion is configured to interact with the portion of the fluid to cause the portion to rotate to define at least one second cyclone exterior to the first cyclone in each outer portion.

55. The separator as claimed in claim 49 wherein the wall in the region of each of the outer portions is configured to produce a local pressure differential within the outer portion.

56. The separator as claimed in claim 55 wherein the local pressure differential is produced by shearing fluid over a discontinuity in the wall.

57. The separator as claimed in claim 55 wherein the wall is configured to produce a boundary layer flow and the local pressure differential is produced by configuring the wall to increase the boundary layer flow to a Reynolds number greater than 3000.

58. The separator as claimed in claim 31 wherein the outer portions are positioned symmetrically around the inner portion.

* * * * *